(12) United States Patent
McCulloch et al.

(10) Patent No.: US 8,873,827 B2
(45) Date of Patent: Oct. 28, 2014

(54) DETERMINATION OF SPATIAL PROXIMITY BETWEEN FEATURES OF INTEREST IN BIOLOGICAL TISSUE

(75) Inventors: Colin Craig McCulloch, Ballston Lake, NY (US); Christopher James Sevinsky, Watervliet, NY (US); Jingyu Zhang, Rexford, NY (US)

(73) Assignee: General Electric Company, Niskayuna, NY (US)

( * ) Notice: Subject to any disclaimer, the term of this patent is extended or adjusted under 35 U.S.C. 154(b) by 302 days.

(21) Appl. No.: 13/539,187

(22) Filed: Jun. 29, 2012

(65) Prior Publication Data
US 2014/0003702 A1    Jan. 2, 2014

(51) Int. Cl.
*G06K 9/00*    (2006.01)

(52) U.S. Cl.
USPC .......................................................... 382/134

(58) Field of Classification Search
None
See application file for complete search history.

(56) References Cited

U.S. PATENT DOCUMENTS

| 7,668,586 | B2 | 2/2010 | Hyman et al. |
| 2003/0064025 | A1 | 4/2003 | Yang et al. |
| 2009/0237501 | A1 | 9/2009 | Lemmer et al. |
| 2010/0254589 | A1* | 10/2010 | Gallagher ..................... 382/133 |

FOREIGN PATENT DOCUMENTS

| WO | 2008077245 A1 | 7/2008 |
| WO | 2011076895 A1 | 6/2011 |

OTHER PUBLICATIONS

Barash, E.; Dinn, S.; Sevinsky, C.; Ginty, F., "Multiplexed Analysis of Proteins in Tissue Using Multispectral Fluorescence Imaging," Medical Imaging, IEEE Transactions on , vol. 29, No. 8, pp. 1457, 1462, Aug. 2010.*
Baker, et al. Direct Visualization of Heterogeneous Extravascular Distribution of Trastuzumab in Human Epidermal Growth Factor Receptor Type 2 Overexpressing Xenografts, Clin Cancer Res 2008; 14:271-2179, Published online Apr. 1, 2008.
Cabenda pharmaceutical research limited, "innovative tools for drug discovery", www.cabenda.com, info@cabenda.com, Dec. 8, 2008.
Carter, K.M. et al., "Information Preserving Component Analysis: Data Projections for Flow Cytometry Analysis", IEEE Journal of Selected Topics in Signal Processing, Feb. 2009, vol. 3, pp. 148-158.
Fenton, B.M. et al., "Zonal Image Analysis of Tumour Vascular Perfusion, Hypoxia, and Necrosis", British Journal of Cancer, Jun. 7, 2002, vol. 86, pp. 1831-1836.

(Continued)

Primary Examiner — Atiba O Fitzpatrick
Assistant Examiner — Thomas A James
(74) Attorney, Agent, or Firm — Eileen B. Gallagher

(57) ABSTRACT

Exemplary embodiments enable determination of spatial proximity between two or more features in biological tissue. An exemplary method includes identifying a morphological feature in an image of the biological tissue based on expression levels of a first biomarker indicative of the morphological feature, and receiving a result of a segmentation analysis performed on the image of the biological tissue identifying a set of morphological units in the image external to the morphological feature. An exemplary method includes determining an expression level of a second biomarker corresponding to each unit in the set of morphological units in the image of the biological tissue, and determining a spatial distance between the morphological feature and each unit in the set of morphological units. An exemplary method further includes automatically determining a relationship between expression levels of the second biomarker and corresponding spatial distance from the morphological feature of the set of morphological units.

18 Claims, 15 Drawing Sheets

(56) References Cited

OTHER PUBLICATIONS

Huxham, et al. "Microregional Effects of Gemcitabine in HCT-116 Xenografts", Cancer Res 2004;64:6537-6541, Published online on Sep. 16, 2004.

Loukas, Constantinos G., et al., "Tumor Hypoxia and Blood Vessel Detection", Techniques in Bioinformatics and Medical Informatics, Jan. 24, 2006, vol. 980, pp. 125-138, abstract only.

Ng, et al., "A Fast and Efficient Implementation of Qualitatively Constrained Quantile Smoothing Splines", Statistical Modelling 2007; 7(4); 315-328.

Ramanathan, K., et al., "Automated Tracking of Biological Cells in an "in-vitro" Environment Using Active Contours and Distance Measures", IEEE 5th International Conference on Cybernetics and Intelligent Systems (CIS), Sep. 17-19, 2011, pp. 241-246.

Rosenfeld, et al., "Distance Functions on Digital Pictures", Pattern Recognition, Pergamon Press 1968, vol. 1, pp. 33-61.

Xu, Xiayu, et al., "Vessel Boundary Delineation on Fundus Images Using Graph-Based Approach", IEEE Transactions on Medical Imaging, Jun. 2011, vol. 30, pp. 1184-1191.

\* cited by examiner

DETERMINATION OF SPATIAL PROXIMITY BETWEEN FEATURES OF INTEREST IN BIOLOGICAL TISSUE

BACKGROUND

Malignancies with vascular pathologies are common, including cardiovascular diseases and most forms of cancers. Oxygenation in human tissues ranges from two to nine percent. Hypoxia is characterized by oxygen levels of less than two percent. Differing oxygenation has well established effects on physiology, including cancer progression and tissue ischemia in stroke. Due to irregular vascular function in many diseases, hypoxia occurs. The degree to which hypoxia varies as a function of distance from vasculature is highly variable due to differences in vascular malformation or injury, as well as inherent differences in diffusion of dissolved oxygen in different tissues. Direct measurement of tissue oxygenation in fixed surgically removed structures, however, is not possible.

SUMMARY

The inventors of the present invention recognized that quantitative spatial characterization of hypoxia, and other conditions that can be characterized by at least one biomarker expression level, would advance the understanding of basic disease biology and improve the understanding of the diffusion of drugs into tissue. The inventors of the present invention recognized that spatial characterization may be applied to characterize the extent of malformation in proliferative diseases such as cancer.

In accordance with one exemplary embodiment, a computer-implemented method is provided for determining a relationship between biomarker expression levels of morphological units in biological tissue and their spatial distance from a morphological feature. The method includes identifying a morphological feature in an image of the biological tissue based on expression levels of a first biomarker indicative of the morphological feature. The method includes receiving a result of a segmentation analysis performed on the image of the biological tissue. The result of the segmentation analysis identifies a first set of morphological units in the image external to the morphological feature, where the first set of morphological units includes cells and/or sub-cellular components. The method also includes determining an expression level of a second biomarker corresponding to each unit in the first set of morphological units in the image of the biological tissue, and determining a spatial distance between the morphological feature and each unit in the first set of morphological units. The method further includes automatically rendering, on a user interface displayed on a visual display device, a representation of a relationship between the expression levels of the second biomarker and the corresponding spatial distance from the morphological feature of the first set of morphological units.

In accordance with another exemplary embodiment, a computer system is provided for determining a relationship between biomarker expression levels of morphological units in biological tissue and their spatial distance from a morphological feature. The system includes a storage device and a processor. The processor is configured to identify a morphological feature in an image of biological tissue based on expression levels of a first biomarker indicative of the morphological feature. The processor is configured to receive a result of a segmentation analysis performed on the image of the biological tissue. The result of the segmentation analysis identifies a first set of morphological units in the image external to the morphological feature, where the first set of morphological units includes cells and/or sub-cellular components. The processor is also configured to determine an expression level of a second biomarker corresponding to each unit in the first set of morphological units in the image of the biological tissue, and to determine a spatial distance between the morphological feature and each unit in the first set of morphological units. The processor is further configured to determine a representation of a relationship between the expression levels of the second biomarker and the corresponding spatial distance from the morphological feature of the first set of morphological units, and to store a representation of the relationship on the storage device.

In accordance with another exemplary embodiment, one or more computer-readable media are provided having encoded thereon one or more computer-executable instructions for determining a relationship between biomarker expression levels of morphological units in biological tissue and spatial distance from a morphological feature. The one or more instructions include instructions for identifying a morphological feature in an image of the biological tissue based on expression levels of a first biomarker indicative of the morphological feature. The one or more instructions include instructions for receiving a result of a segmentation analysis performed on the image of the biological tissue. The result of the segmentation analysis identifies a first set of morphological units in the image external to the morphological feature, where the first set of morphological units includes cells and/or sub-cellular components. The one or more instructions also include instructions for determining an expression level of a second biomarker corresponding to each unit in the first set of morphological units in the image of the biological tissue, and determining a spatial distance between the morphological feature and each unit in the first set of morphological units. The one or more instructions further include instructions for automatically rendering, on a user interface displayed on a visual display device, a representation of a relationship between the expression levels of the second biomarker and the corresponding spatial distance from the morphological feature of the first set of morphological units.

BRIEF DESCRIPTION OF THE DRAWINGS

The foregoing and other objects, aspects, features, and advantages of exemplary embodiments will become more apparent and may be better understood by referring to the following description taken in conjunction with the accompanying drawings, in which.

DETAILED DESCRIPTION

Figure 1:
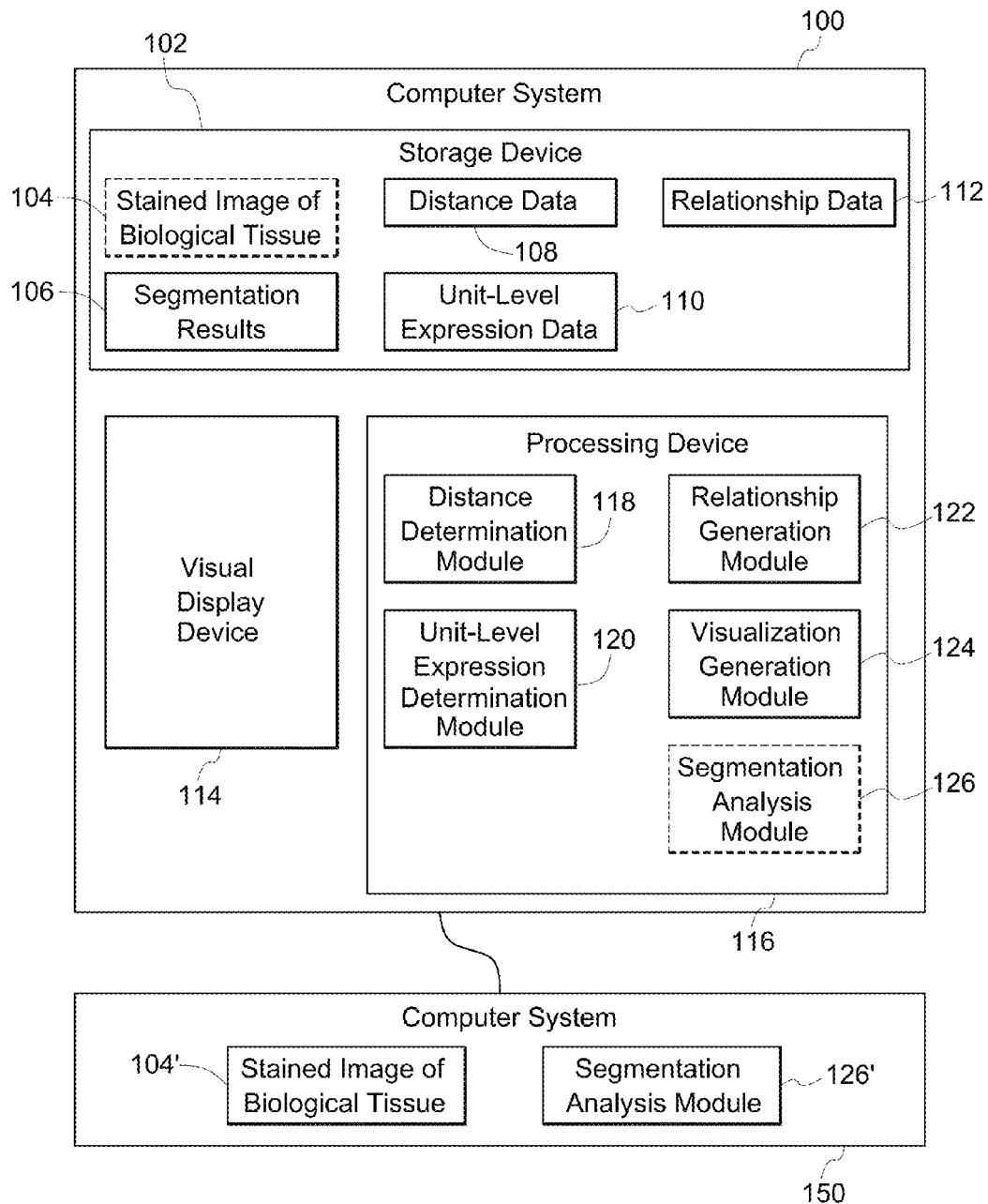
FIG. 1 is a block diagram of exemplary computing system components that may be used to perform exemplary methods.

Exemplary embodiments provide methods, systems, and devices to enable determination a relationship between biomarker expression levels of morphological units in biological tissue and their spatial distance from a morphological feature. Exemplary embodiments identify a morphological feature in an image of the biological tissue based on expression levels of a first biomarker indicative of the morphological feature, and receive a result of a segmentation analysis performed on the image of the biological tissue identifying a set of morphological units in the image external to the morphological feature. Exemplary embodiments determine an expression level of a second biomarker corresponding to each unit in the set of morphological units in the image of the biological tissue, and determine a spatial distance between the morphological feature and each unit in the set of morphological units. Exemplary embodiments further automatically determine a relationship between expression levels of the second biomarker and corresponding spatial distance from the morphological feature of the set of morphological units.

In one example, a representation of the relationship between the expression level of a biomarker (e.g., a protein) and the distance from a given morphological structure (e.g., the nearest blood vessel) is generated on a visual display device. In a dataset of cells where some are marked as a blood vessel and others are marked with their distances from the nearest blood vessel, a graphical plot may be generated in which a first axis represents the distance of each cell from the nearest blood vessel, and a second axis represents the expression in the cells of one or more biomarkers. In some exemplary embodiments, a two-dimensional probability density or scatterplot may be generated from the cell data and placed in the plot space. In some exemplary embodiments, one or more curves may be overlaid in the plot space to represent the expression level of the biomarker at a user-specified percentile level (for example, median, 10%, 90%) at one or more distances from the blood vessel. Exemplary embodiments thereby enable convenient, quick and efficacious review of differences between the different cells based on their spatial distance from the nearest blood vessel.

Exemplary morphological features may include, but are not limited to, one or more blood vessels, one or more immune cells, one or more cancer cells, one or more tumor cells, one or more epithelial cells, one or more extra-cellular matrix components, and the like.

Exemplary morphological units may include, but are not limited to, cells, sub-cellular components (e.g., nuclei, cytoplasms, membranes), extra-cellular components (e.g., matrix proteins), multi-cellular components, and the like.

Exemplary embodiments are described below with reference to the drawings. One of ordinary skill in the art will recognize that exemplary embodiments are not limited to the illustrative embodiments, and that components of exemplary systems, devices and methods are not limited to the illustrative embodiments described below.

I. Exemplary Non-Limiting Embodiments

FIG. 1 is a block diagram of an exemplary computer system 100 for determining spatial proximity between morphological units in biological tissue.

Figure 2:
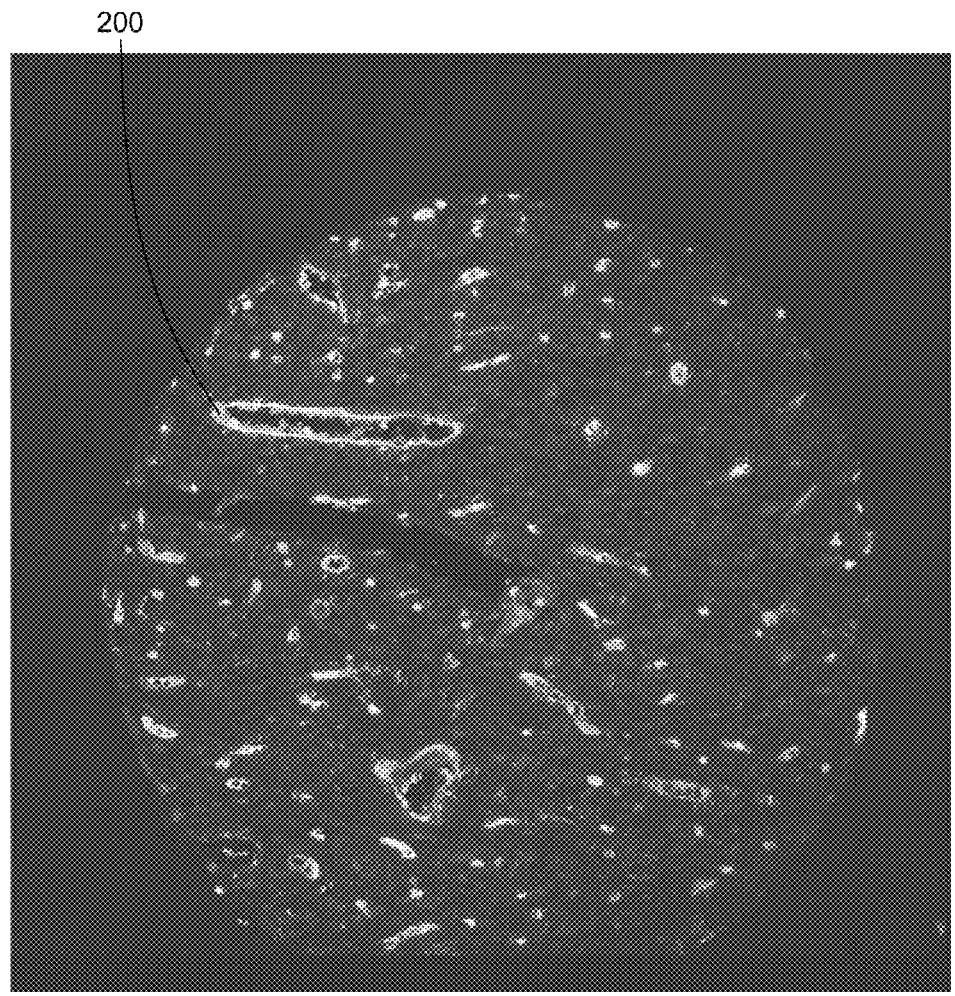
FIG. 2 illustrates an image of a microscope field-of-view of stained biological tissue.

In an exemplary embodiment, the computer system 100 may store one or more stained images of biological tissue, and/or image data on stained images of biological tissue. In another exemplary embodiment, the image data may be stored on a separate computer system 150. Embodiments taught herein leverage multiplexed fluorescence biomarker images that are generated through known techniques, such as a staining-bleaching-restaining technique. FIG. 2 illustrates an image of a microscope field-of-view of stained biological tissue. The image illustrates the expression of biomarkers by individual cells within a larger tissue sample of cells. The tissue sample may be a group of cells from a cell culture or a sample of an organ, a tumor, or a lesion. The tissue sample may also be part of a group of specimens of similar tissue from different subjects, known as a cohort. These groups of tissue samples may represent one or more disease or condition models, different stages within a disease or condition model, or one or more responses to treatment of a disease or condition.

Images of each stained field-of-view are generated through known techniques, such as with a digital camera coupled with an appropriate microscope and appropriate quality control routines. Automated image registration and analysis may also be used to quantify the biomarker concentration levels for individual delineated cells, or even sub-cellular compartments, such as nucleus, cytoplasm, and membrane. The data values resulting from the multiplexing and image analysis of cells may be stored alone or in conjunction with results of further analysis. A database may preserve the identity of the measurement of strength of the biomarker expression including the tissue and the location within the tissue from which it was drawn. The location may indicate the particular cell and/or tissue from which a particular measurement was drawn, and may also include the compartment, nucleus, cytoplasm or membrane, associated with the measurement. The information may be stored in a database, which may be maintained in the storage device 102 or in a network device.

The computer system 100 may include or be connectable to a storage device 102 for storing data in data structures, and a processing device programmed or configured to perform one or more computer-executable instructions for perform exemplary methods. The computer system 100 may include or be connectable to a processing device 116 programmed or configured to perform exemplary embodiments.

The storage device 102 may store one or more images and/or image data 104 corresponding to biological tissue stained to reveal expression levels of one or more biomarkers. In another exemplary embodiment, the image data 104 may be stored on a separate computer system 150 and may be accessible to computer system 100.

The processing device 116 may include an image segmentation analysis module 126 that may be used to segment an image of biological tissue (e.g., the stored image data 104) into a plurality of morphological units represented in the image. Any suitable image segmentation technique may be used and exemplary embodiments are not limited by any specific image segmentation technique. In another exemplary embodiment, the image segmentation analysis module 126 may be stored on a separate computer system 150, and results of the segmentation analysis may be accessible to computer system 100. The storage device 102 may store segmentation results 106 generated by image segmentation analysis performed on the image data 106 to identify morphological units in biological tissue.

Figure 3:
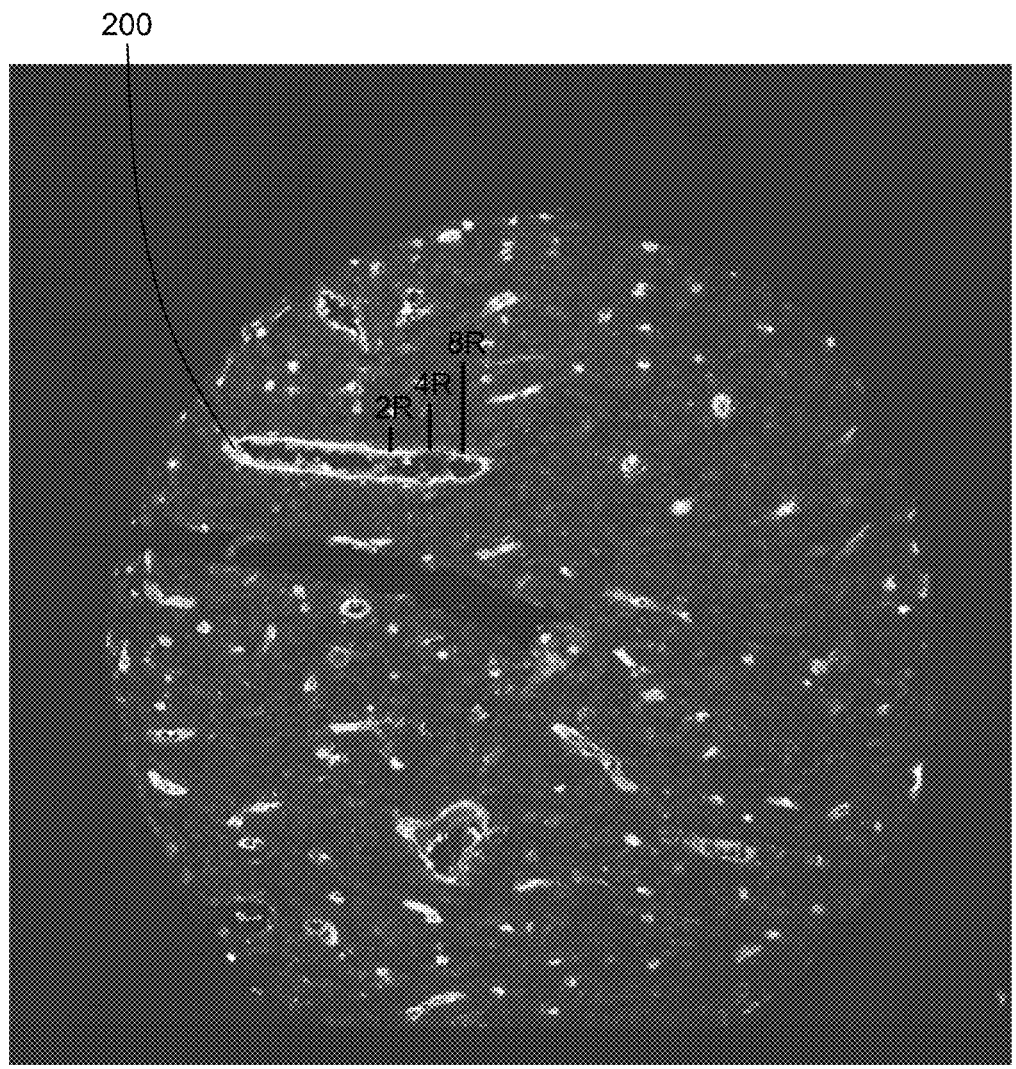
FIG. 3 illustrates the image of FIG. 2 showing exemplary spatial distances from a blood vessel.

The processing device 116 may include a distance determination module 118 for determining spatial distances between two or more morphological units in an image of biological tissue. The distances generated by the distance determination module 118 may be stored as distance data 108 in one or more data structures in the storage device 102. FIG. 3 illustrates the image of FIG. 2 showing exemplary spatial distances from the blood vessel 200.

The processing device 116 may include a unit-level expression determination module 120 for determining expression levels of one or more biomarkers at the level of morphological units in an image of biological tissue. The data generated by the unit-level expression determination module 120 may be stored as unit-level expression data 110 in one or more data structures in the storage device 102.

The processing device 116 may include a relationship generation module 122 for determining a relationship between unit-level expression of one or more biomarkers and spatial distance of the units from a morphological feature of interest. The data generated by the relationship generation module 122 may be stored as relationship data 112 in one or more data structures in in the storage device 102.

The processing device 116 may include a visualization generation module 124 for generating a visualization of the data stored in the storage device 102.

The computer system 100 may include or be connectable to a visual display device 114 for rendering visualizations generated by the visualization generation module 124.

Figure 4:
FIG. 4 illustrates an exemplary data structure for storing spatial distance information corresponding to biological tissue.

Exemplary embodiments may store, in a suitable data structure, information on the expression levels of one or more biomarkers at the level of one or more morphological units, and information on the spatial distance of the morphological units from a morphological feature of interest. FIG. 4 illustrates an exemplary data structure 400 for storing spatial distance information corresponding to biological tissue. The morphological units may be, for example, individual cells or sub-cellular components (e.g., individual cytoplasms, individual membranes, individual nuclei). Each row in the table 400 may represent and contain information on a separate morphological unit. Exemplary columns in table 400 include a column 402 for identifying different morphological units in biological tissue. The table 400 may include one or more columns 404 for representing the spatial distance of each morphological unit from one or more morphological features. The spatial distances may be represented in any suitable unit, for example, average cell radii, pixels, microns, and the like. The table 400 may include one or more columns 406 for indicating whether each morphological unit is part of one or more morphological features of interest. For example, the column 406 may indicate whether each morphological unit represented is part of a blood vessel. Any suitable classification technique, for example, intensity thresholding, may be used to determine morphological units in the biological tissue that are part of the morphological feature of interest. The table 400 may include one or more columns 408, 410 for representing unit-level expression levels of one or more biomarkers for each morphological unit represented.

One of ordinary skill in the art will recognize that one or more additional or fewer columns and/or rows may be included in table 400, and that table 400 may have two or more dimensions. One of ordinary skill in the art will also recognize that any suitable data structure, including and other than tables, may be used to store data in exemplary embodiments.

Exemplary embodiments may analyze the data stored in the data structure to visualize and render information on the expression levels of one or more biomarkers at the level of one or more morphological units, and information on the spatial distance of the morphological units from a morphological feature of interest. In some exemplary embodiments, expression levels of a single biomarker in morphological units may be visualized and/or analyzed with respect to spatial distance from a morphological feature of interest.

In other exemplary embodiments, expression levels of two or more biomarkers in morphological units may be visualized and/or analyzed with respect to spatial distance from a morphological feature of interest. Expression levels of a plurality of biomarkers may be associated with and/or indicative of a particular biological or physiological characteristic of interest. For example, a disease may be indicated by the co-localization of high expression levels of two or more biomarkers in morphological units. In this example, a relationship between the disease and distance from a morphological feature of interest may be determined by analyzing and/or visualizing expression levels of the two or more biomarkers with increasing and/or decreasing spatial distance from the morphological feature of interest. Exemplary embodiments may analyze and visualize expression levels of multiple biomarkers using image data from multiplexed biomarker images that exhibit expression levels of multiple biomarkers. Exemplary embodiments may also use image data from multiple non-multiplexed biomarker images, each exhibiting expression levels of a single biomarker.

In one example, a graph may be plotted with a first axis representing expression levels of a biomarker at the level of a morphological unit, and a second axis representing the spatial distance from each morphological unit to a morphological feature of interest. In the graph, representations of morphological units may be rendered in a scatterplot in the x-y space. That is, the x-y space may show the density of morphological units at different expression levels and different distances. In some exemplary embodiments, the expression level of a biomarker at any desired percentile level may be represented at different distances along the second axis. This exemplary visualization enables viewing how the expression levels of a biomarker changes with increasing or decreasing distance from a morphological feature of interest.

Figure 5:
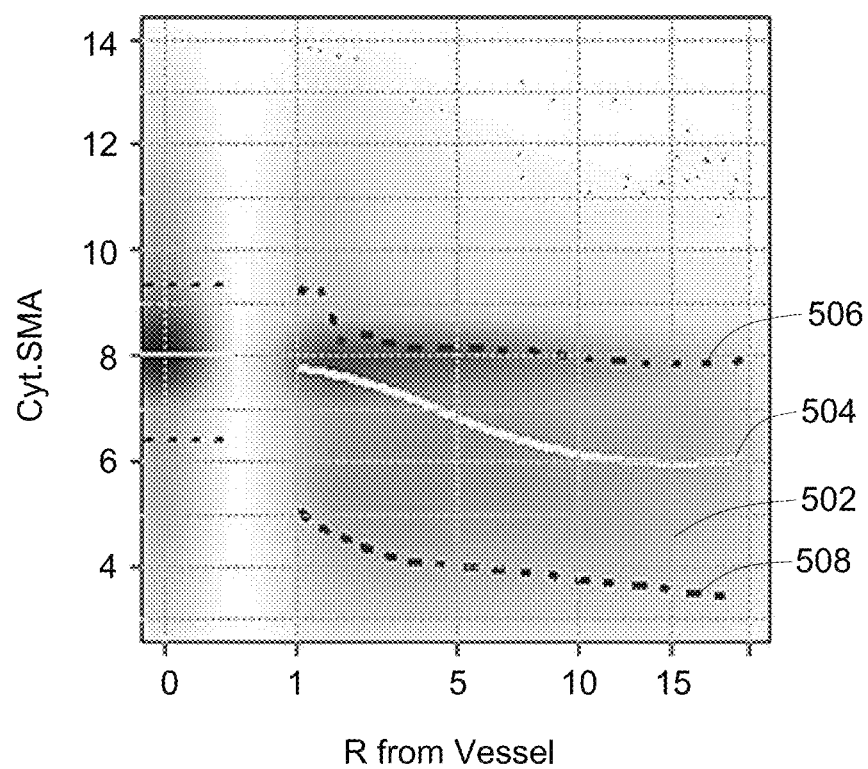
FIG. 5 illustrates an exemplary visualization of spatial distance information corresponding to biological tissue.

FIG. 5 illustrates an exemplary visualization of spatial distance information corresponding to biological tissue. FIG. 5 is a graph of expression levels of non-structural biomarker for smooth muscle actin (SMA) along the y-axis (in units of $\log_2$ of the fluorescence intensity measurements of the biomarker expression) and distances from the nearest blood vessel along the x-axis (in units of average cell radii). In FIG. 5, a scatterplot 502 of the distribution of morphological units (e.g., cells) is plotted in the x-y space, a curve 504 is plotted representing the median expression level of SMA over different distance values, a curve 506 is plotted representing the $90^{th}$ percentile expression level of SMA over different distance values, and a curve 508 is plotted representing the $10^{th}$ percentile expression level of SMA over different distance values.

In another example, a graph may be plotted with a first axis representing a combination of the expression levels of a plurality of biomarkers at the level of a morphological unit, and a second axis representing the spatial distance from each morphological unit to a morphological feature of interest. Expression levels of the plurality of biomarkers may be associated with and/or indicative of a particular biological or physiological characteristic of interest. For example, a disease may be indicated by the co-localization of high expression levels of two or more biomarkers. In exemplary embodiments, the expression levels of a plurality of biomarkers may be combined in any suitable way, for example, as an average, as a weighted average, and the like. This exemplary visualization enables viewing how the expression levels of multiple biomarkers changes with increasing or decreasing distance from a morphological feature of interest.

In other exemplary embodiments, multidimensional graphs may be plotted to visualize and render information on the expression levels of a plurality of biomarkers at the level of one or more morphological units, and information on the spatial distance of the morphological units from a morphological feature of interest. In one example, a graph may have a first axis representing expression levels of a first biomarker at the level of a morphological unit, a second axis representing expression levels of a second biomarker, and a third axis representing the spatial distance from each morphological unit to a morphological feature of interest. This exemplary visualization enables viewing how the expression levels of multiple biomarkers changes with increasing or decreasing distance from a morphological feature of interest.

In other exemplary embodiments, a relationship between the spatial distance from a morphological feature and expression levels of one or more biomarkers may be determined and/or visualization. Any suitable relationship may be determined between the biomarker expression levels and corresponding spatial distances from a morphological feature of interest. An exemplary relationship may be determined based on a correlation analysis to generate a negative correlation, a positive correlation or a lack of correlation between the biomarker expression levels and corresponding spatial distances. In one example, exemplary embodiments may determine that the expression levels of a particular biomarker increases with increasing spatial proximity to a blood vessel.

In some exemplary embodiments, expression levels of a first biomarker may be analyzed in a first set of morphological units including spatial distances from the units to a morphological feature of interest. Exemplary embodiments may determine a collection of units within the first set of units in which expression levels of the first biomarker satisfy one or more predetermined criteria. Exemplary embodiments may render a representation of the collection of units at different distances from the morphological feature of interest.

In some exemplary embodiments, expression levels of first and second biomarkers may be analyzed in a first set of morphological units including spatial distances from the units to a morphological feature of interest. Exemplary embodiments may determine a collection of units within the first set of units in which expression levels of the first and second biomarkers satisfy one or more predetermined criteria. Exemplary embodiments may render a representation of the collection of units at different distances from the morphological feature of interest.

Figure 6:
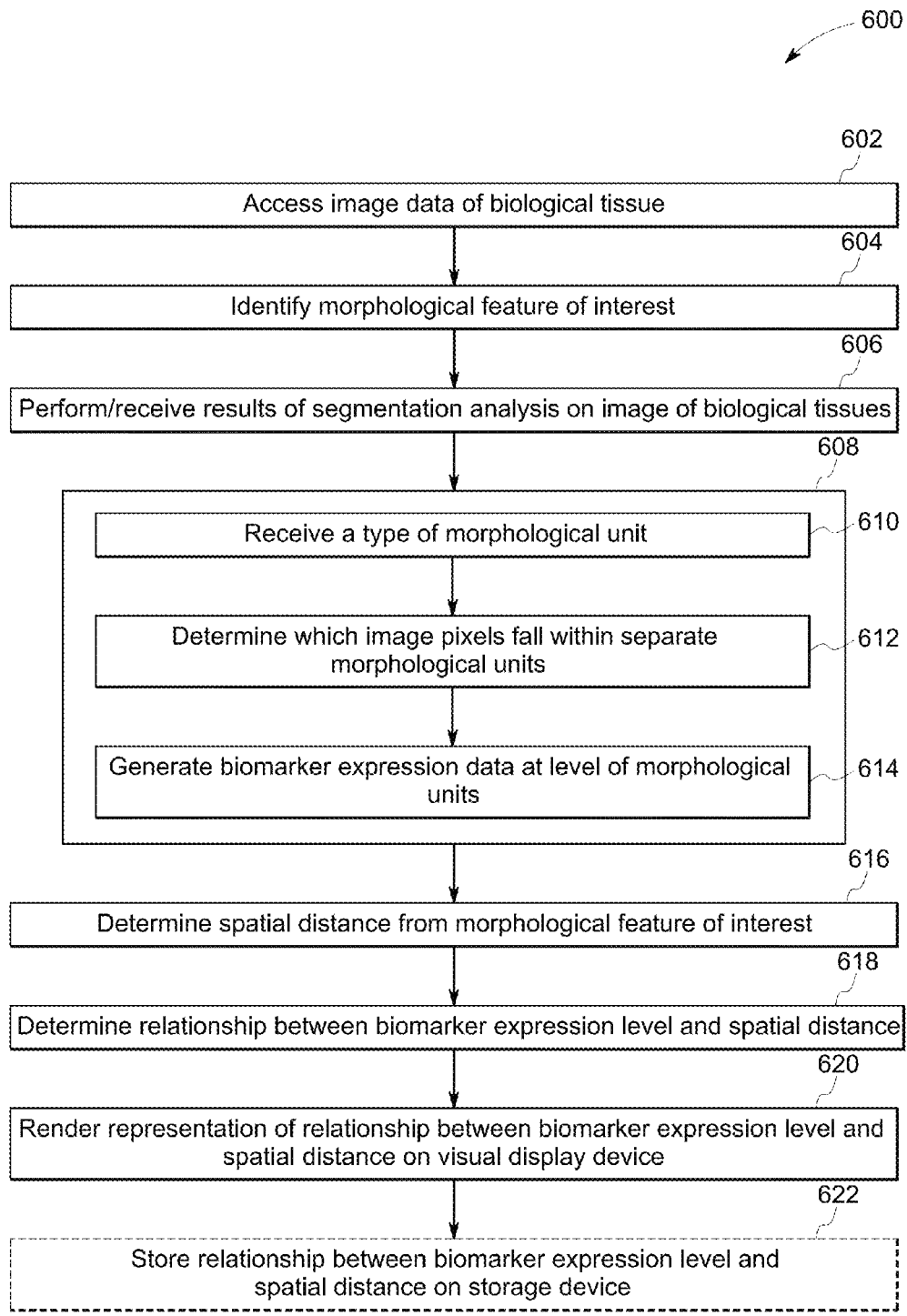
FIG. 6 is a flowchart illustrating an exemplary method of analyzing spatial distance information in biological tissue.

FIG. 6 is a flowchart illustrating an exemplary method for determining a relationship between biomarker expression levels of morphological units in biological tissue and spatial distance from a morphological feature. In the exemplary method, a spatial proximity is determined from a set of morphological units to a morphological feature of interest in the biological tissue.

In step 602, data corresponding to an image of biological tissue—stained to reveal expression of one or more biomarkers in the biological tissue—is accessed. In an exemplary embodiment, an image of biological tissue is received. In another exemplary embodiment, image data corresponding to an image of biological tissue—stained to reveal expression of one or more biomarkers in the biological tissue—is received. FIG. 2 illustrates an exemplary image of biological tissue stained to reveal expression levels of biomarker CD31 that indicates blood vessels.

In step 604, exemplary embodiments may analyze the image data of the biological tissue to automatically identify a morphological feature of interest based on the expression levels of at least one biomarker that are indicative of the morphological feature. In one example in which vascular structures (for example, blood vessels) are the morphological features of interest, detection of high expression levels of the biomarker CD31 in the image indicates the presence of one or more vascular structures in the biological tissue. CD31 is a membrane protein that is constitutively expressed on the surface of endothelial cells. Because blood vessels are lined with endothelial cells, high expression levels of CD31 indicate the presence of blood vessels. FIG. 2 illustrates an exemplary image of biological tissue in which a blood vessel 200 is identified based on high expression levels of biomarker CD31.

In optional step 606, exemplary embodiments may perform segmentation analysis on the image of biological tissue to identify one or more morphological units in the image. In alternative step 604, the results of a segmentation analysis of the image of biological tissue are received. The results identify a set of morphological units in the image. Exemplary morphological units identified by the segmentation analysis may include, but are not limited to, cells, sub-cellular components (e.g., nuclei, cytoplasms, membranes), extra-cellular components (e.g., matrix proteins), multi-cellular components, and the like. In another exemplary embodiment, the results of a segmentation analysis performed on the image of biological tissue may be received. Any suitable image segmentation technique may be used and exemplary embodiments are not limited by any specific image segmentation technique.

Any suitable classification technique, for example, intensity thresholding, may be used to determine morphological units in the biological tissue that are part of the morphological feature of interest. In some exemplary embodiments, a morphological unit in the biological tissue may be determined to be part of the morphological feature of interest if the expression levels of one or more biomarkers in the unit satisfy one or more predetermined criteria. For example, if the expression level of the biomarker CD31 in a morphological unit is above a predetermined level, the morphological unit may be determined to be part of a blood vessel. In other exemplary embodiments, a morphological unit in the biological tissue may be determined to be part of the morphological feature of interest based on a comparison between the expression level of one or more biomarkers in the unit and the expression level of the biomarkers in a collection of units in the image of biological tissue. For example, if the expression level of the biomarker CD31 in a morphological unit is exactly or approximately at or above the $90^{th}$ percentile among all morphological units in the image of biological tissue, the morphological unit may be determined to be part of a blood vessel. These exemplary non-limiting techniques of determining morphological units that are part of the morphological feature of interest are illustrative and are not meant to be limiting.

In step 608, exemplary embodiments may determine expression levels of one or more biomarkers of interest in a set of morphological units at the level of morphological units in the image of biological tissue. In an exemplary embodiment, the set of morphological units may be disposed outside the morphological feature identified in step 604. The expression levels used in exemplary embodiments are granular at the level of a morphological unit of interest, and not at the pixel level. That is, exemplary embodiments enable determination and visualization of expression levels at the cell-level, membrane-level, nucleus-level, and the like.

Steps 610-614 illustrate an exemplary method 608 for determining expression levels of one or more biomarkers of interest in a set of morphological units at the level of morphological units. In step 610, exemplary embodiments may receive an identification of one or more types of morphological units (e.g., cell, membrane, cytoplasm, nucleus) so that biomarker expression will be analyzed and/or visualized at the level of the morphological unit. The identification of the type of morphological unit may be received from a user, may be predetermined, or may be automatically determined (for example, based on the biomarker to be analyzed and/or visualized). In step 612, exemplary embodiments may determine which pixels in the image of biological tissue fall within separate morphological units. For example, exemplary embodiments may determine that a first set of image pixels represent a first nucleus, while a second set of image pixels represent a second nucleus in the biological tissue. In step 614, the pixel-level data received from the segmentation analysis may be used to generate biomarker expression data at the level of the selected morphological unit. For example, exemplary embodiments may determine and/or visualize a first expression level for a first biomarker representative of a first nucleus, and a second expression level for the first biomarker representative of a second nucleus in the biological tissue. Any suitable technique may be used to determine expression levels at the level of morphological units. For example, the expression levels of a biomarker at all image pixels corresponding to a selected morphological unit (e.g., a nucleus) may be combined using any suitable technique (e.g., mean, median, mean+(T*standard deviation, where T is a suitable multiplier), and the like) to determine the unit-level expression level of the biomarker.

In contrast to exemplary embodiments, certain conventional systems analyze and visualize biomarker expression at the pixel-level, and not at the level of the morphological units in biological tissue. The use of cell-level or compartment-level biomarker expression in exemplary embodiments is advantageous over the use of pixel-level biomarker expression in conventional systems. The use of cell-level or compartment-level data enables the determination of how cell-level or compartment-level properties vary with spatial distance from a morphological feature. These cell-level or compartment-level properties may be exhibited as biomarker expression levels and, therefore, cell-level or compartment-level biomarker expression is essential in accurate and meaningful analysis of biological units and their properties.

The use of cell-level or compartment-level biomarker expression is also advantageous because it enables restriction of the analysis and/or visualization of biomarker expression to one or more particular types of morphological units in some exemplary embodiments. For example, biomarker expression may be determined and/or visualized at the cell-level and may be restricted to all cells in the biological tissue or to particular groups or types of cells in the biological tissue. In another example, biomarker expression may be determined and/or visualized at the membrane-level and may be restricted to only the membranes in the biological tissue. In another example, biomarker expression may be determined and/or visualized at the nucleus-level and may be restricted to only the nuclei in the biological tissue. In another example, biomarker expression may be determined and/or visualized at the cytoplasm-level and may be restricted to only the cytoplasms in the biological tissue. Restriction of biomarker expression analysis and/or visualization to certain groups or types of morphological units in the biological tissue enables determination of relationships between spatial distance and specific features and morphologies in the biological tissue. In certain exemplary embodiments implementing translocation, analysis and/or visualization of biomarker expression may be based on a plurality of morphological unit types, for example, a ratio between expression levels of a biomarker in membranes to expression levels of the biomarker in nuclei. For example, exemplary embodiments enable determination and/or visualization of how the expression levels in membranes to nuclei vary at different spatial distances from a morphological feature of interest.

Furthermore, the use of cell-level or compartment-level biomarker expression in exemplary embodiments is advantageous because it enables differentiating between specific staining with non-specific staining in biological tissue. Non-specific staining is a common problem in tissue staining in which the primary antibody used binds to amino acids other than those within the desired epitope of the antigen. The problem of non-specific staining can result in high background expression levels for a biomarker and an inability to visualize an antigen of interest in its appropriate cellular location. Conventional techniques of biomarker visualization that use pixel-level biomarker expression data cannot be used to identify the problem of non-specific staining or to distinguish regions of specific staining from regions of non-specific staining. This is because pixel-level data in conventional systems does not allow identification of the type of biological unit in which a certain unit-level biomarker expression is seen, and thereby does not enable determination that the biomarker is expressed as a result of non-specific staining because that type of biological unit does not typically express the biomarker.

In addition, exemplary embodiments enable within-cell heterogeneity metrics to analyze biomarker expression inside the cell compartment. For example, the average biomarker expression in the membrane may be compared to the average biomarker expression in the nucleus, and each or both the expressions may be analyzed with respect to spatial distance from a morphological feature of interest (e.g., the nearest blood vessel).

In contrast, exemplary embodiments enable identification and visualization of the type of biological unit in which a certain unit-level biomarker expression is seen, and enables determination that the biomarker is expressed as a result of non-specific staining because the particular type of biological unit does not typically express the biomarker. For example, biomarker expression may be determined and/or visualized at the cell-level, at the membrane-level, at the cytoplasm-level, at the nucleus-level, and the like. In an exemplary embodiment, morphological unit-level biomarker expression data is computed and/or visualized (for example, at the level of the cell or sub-cellular component). Exemplary embodiments may determine that a morphological unit-level expression data does not conform to a predetermined expression level or a predetermined range of expression levels characteristic of the type of a morphological unit. This may thereby enable determination that the expression levels are a result of non-specific staining. For example, if a biomarker is not typically expressed in cell membranes, expression of the biomarker at the membrane-level may be analyzed to determine that the expression is due to non-specific staining and should be ignored. Exemplary embodiments may take one or more actions based on the determination of non-specific staining, for example, deletion of data that results from non-specific staining, ignoring the data resulting from non-specific staining, and the like.

In step 616, exemplary embodiments may determine a spatial distance between the morphological feature of interest and each morphological unit in the set of morphological units analyzed in step 608. In an exemplary embodiment, the spatial distance may be determined in terms of pixels between the centroid pixels of two biological units, and then converted into a distance unit, for example, microns. Any suitable image processing technique may be used in step 616, for example, those described in Borgefors, G. "Distance Transformations in Digital Images," Computer Vision, Graphics and Image Processing, 34:344-371, 1986; and Rosenfeld, A. and Pfalz, J. L., "Distance Functions on Digital Pictures," Pattern Recognition, 1:33-61, 1968, the entire contents of which are incorporated herein in their entirety by reference.

In step 618, exemplary embodiments may determine a relationship between the expression levels of the biomarkers determined in step 608 and the spatial distances determined in step 616. For example, a relationship may be determined between the expression levels of a biomarker in cells (i.e., a set of morphological units) and the spatial proximity of the cells from a blood vessel (i.e., a morphological feature of interest). Exemplary embodiments enable continuous expression level tracking so that a relationship between biomarker expression levels and spatial distance may be determined or tracked over continuous expression levels.

Exemplary embodiments also enable continuous distance tracking so that a relationship between biomarker expression levels and spatial distance may be determined or tracked over continuous distances and at any user-specified distance from a morphological feature. In an exemplary embodiment, continuous distance tracking of morphological units from a morphological feature may be implemented by separately analyzing a first set of morphological units that are at the morphological feature and a second set of morphological units that are outside the boundary of the morphological feature. In some quantile regression methods for determining the units at a predetermined biomarker expression percentile, analysis of the first and second sets of morphological units together can results in discontinuities and inaccuracies. The separate analysis of the first and second sets of morphological units avoids any discontinuities in the regression analysis results.

Any suitable relationship may be determined between the biomarker expression levels and corresponding spatial distances from a morphological feature of interest. An exemplary relationship may be determined based on a correlation analysis to generate a negative correlation, a positive correlation or a lack of correlation between the biomarker expression levels and corresponding spatial distances. In one example, exemplary embodiments may determine that the expression levels of a particular biomarker increases with increasing spatial proximity to a blood vessel.

Another exemplary relationship may be determined by charting the distribution of morphological units (e.g., cells) over differential spatial distances from a morphological feature and over differential expression levels of one or more biomarkers. An exemplary distribution may be charted on a scatterplot with a first axis representing different expression levels of a biomarker, a second axis representing different spatial distances from the morphological feature, and morphological units charted in the space of the graph. Another exemplary distribution may be charted on a histogram with a first axis representing different expression levels of a biomarker, a second axis representing different spatial distances from the morphological feature, and morphological units charted in the space of the graph. In some exemplary embodiments, the density of morphological units in the space of the graph may be shown as the darkness of a color shading.

Other exemplary relationship may be determined by charting how the expression levels of one or more biomarkers changes at different spatial distances from a morphological feature of interest. For example, the different expression levels of a biomarker, the mean expression level, the median expression level, standard deviations in the expression levels, one or more desired expression level percentiles, and the like, may be charted at each spatial distance from a morphological feature of interest. At one or more distances from a morphological feature of interest, the number of cells at any desired expression level percentile may be determined and visualized. In addition, at one or more distances from a morphological feature of interest, the expression level of a biomarker at any desired percentile may be determined and visualized. Exemplary biomarker expression percentiles usable in exemplary embodiments may include, but are not limited to, 0%, 5%, 10%, 15%, 20%, 25%, 30%, 35%, 40%, 45%, 50%, 55%, 60%, 65%, 70%, 75%, 80%, 85%, 90%, 95%, 100%, and any numbers therebetween.

Any suitable technique may be used to determine the biomarker expression level at any desired percentile over an image of biological tissue or over all biological tissue for a cohort. Any suitable technique may be used to determine the number of morphological units at any desired biomarker expression percentile over an image of biological tissue or over all biological tissue for a cohort. An exemplary technique is a quantile smoothing method called "constrained b-spline smoothing" described in and available at Ng P. and Maechler M., cobs: COBS—Constrained B-splines (Sparse matrix based), "Qualitatively Constrained (Regression) Smoothing Via Linear Programming and Sparse Matrices," R package version 1.2-2., 2011, http://cran.r-project.org/web/packages/cobs/index.html; and Ng P. and Maechler M., "A Fast and Efficient Implementation of Qualitatively Constrained Quantile Smoothing Splines," Statistical Modeling, 7(4), 315-328, 2007, the entire contents of which are incorporated herein in their entirety by reference. When the COBS method is used on a specific percentile, for example 90%, a smooth curve is fitted through the data so that at any specified spatial location, approximately 90% of the biomarker expression data near that given location falls below the curve and 10% above the curve. Smoothness of the curve is achieved by constraining it to be a quadratic spline with a fixed number of knots (12 knots were used in some exemplary embodiments). As another example, a 50%-COBS curve applied to symmetrically distributed data would be similar to the estimate produced by a least-squares quadratic spline fit.

In step 620, a representation of the relationship determined in step 618 may be rendered on a user interface displayed on a visual display device.

In optional step 622, the relationship or a representation of the relationship determined in step 618 may be saved or stored on one or more non-transitory storage devices.

II. Exemplification and Exemplary Applications

Figure 7:
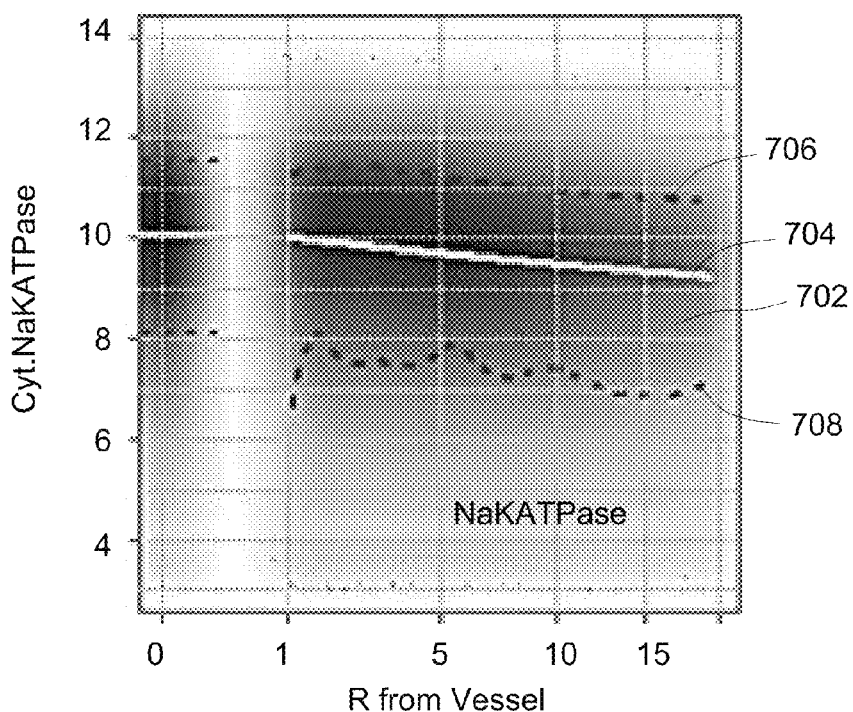
FIGS. 7-9 illustrate graphs generated by exemplary embodiments showing expression levels of different structural biomarkers represented on the y-axis and different spatial distances from blood vessels represented on the x-axis.
Figure 8:
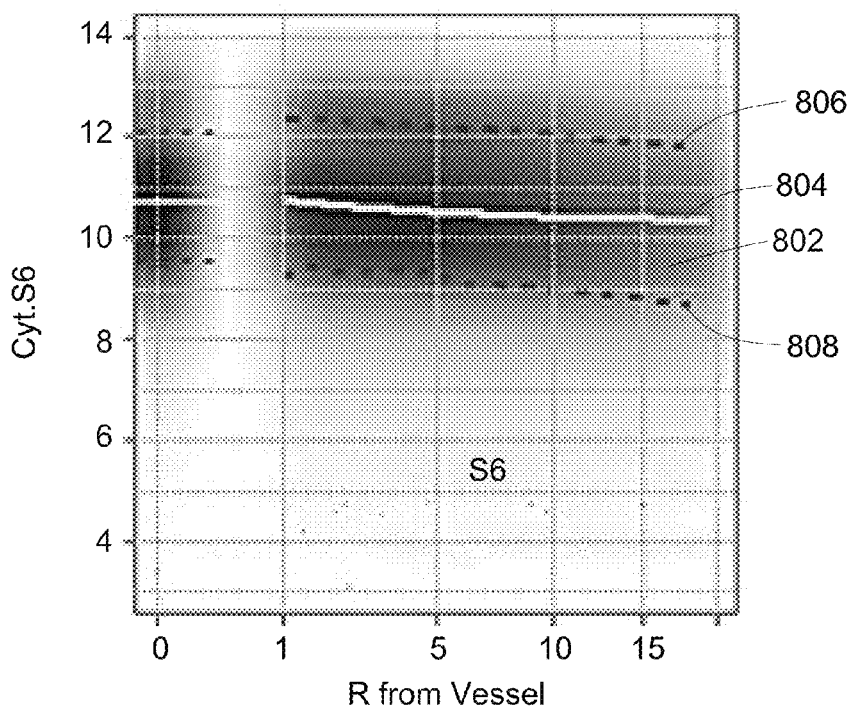
Figure 9:
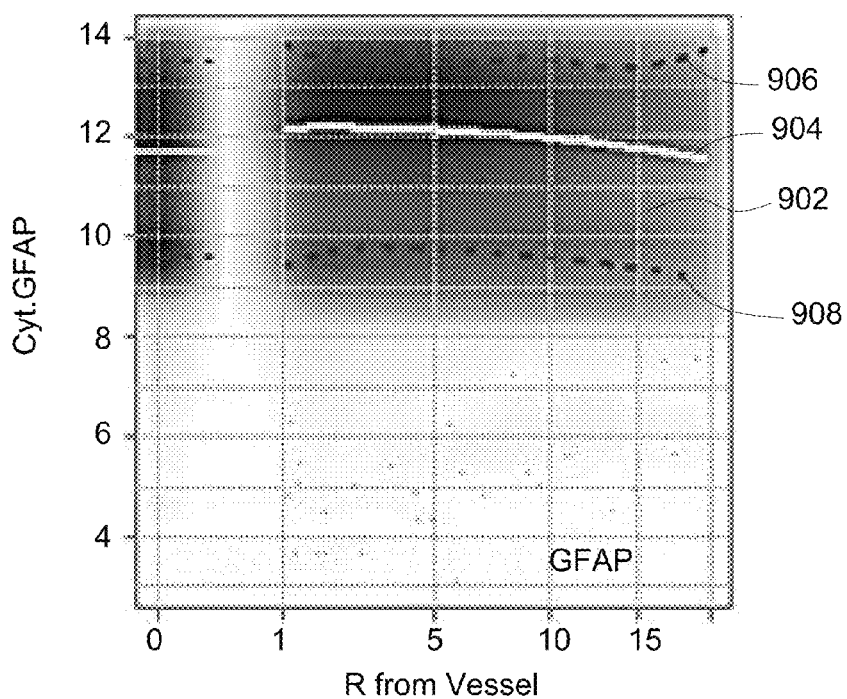

FIGS. 7-9 illustrate graphs generated by exemplary embodiments showing expression levels of different structural biomarkers represented on the y-axis and different spatial distances from blood vessels represented on the x-axis. Each graph shows a scatterplot of the distribution of cells in the x-y space, thereby illustrating a density of cells at different spatial distances from blood vessels and exhibiting different biomarker expression levels. Each graph also illustrates a continuous or discontinuous curve charting the median expression level of the biomarker at different spatial distances from the blood vessel. Each graph also illustrates a curve charting the $90^{th}$ percentile expression level of the biomarker and a curve charting the $10^{th}$ percentile expression level of the biomarker at different spatial distances from the blood vessel.

FIG. 7 is a graph of expression levels of structural biomarker $Na^+/K^+$-ATPase (NaKATPase) along the y-axis and distances from the nearest blood vessel along the x-axis. FIG. 7 illustrates a scatterplot 702 of the distribution of cells in the x-y space, a curve 704 representing the median expression level of NaKATPase over different distance values, a curve 706 representing the $90^{th}$ percentile expression level of NaKATPase over different distance values, and a curve 708 representing the $10^{th}$ percentile expression level of NaKATPase over different distance values.

FIG. 8 is a graph of expression levels of structural biomarker S6 40S ribosomal protein (S6) along the y-axis and distances from the nearest blood vessel along the x-axis. FIG. 8 illustrates a scatterplot 802 of the distribution of cells in the x-y space, a curve 804 representing the median expression level of S6 over different distance values, a curve 806 representing the $90^{th}$ percentile expression level of S6 over different distance values, and a curve 808 representing the $10^{th}$ percentile expression level of S6 over different distance values.

FIG. 9 is a graph of expression levels of structural biomarker glial fibrillary acidic protein (GFAP) along the y-axis and distances from the nearest blood vessel along the x-axis. FIG. 9 illustrates a scatterplot 902 of the distribution of cells in the x-y space, a curve 904 representing the median expression level of GFAP over different distance values, a curve 906 representing the $90^{th}$ percentile expression level of GFAP over different distance values, and a curve 908 representing the $10^{th}$ percentile expression level of GFAP over different distance values.

FIGS. 10-20 are graphs generated by exemplary embodiments showing expression levels of different non-structural biomarkers represented on the y-axis and different spatial distances from blood vessels represented on the x-axis. Each graph shows a scatterplot of the distribution of cells in the x-y space, thereby illustrating a density of cells at different spatial distances from blood vessels and exhibiting different biomarker expression levels. Each graph also illustrates a continuous or discontinuous curve charting the median expression level of the biomarker at different spatial distances from the blood vessel. Each graph also illustrates a curve charting the $90^{th}$ percentile expression level of the biomarker and a curve charting the $10^{th}$ percentile expression level of the biomarker at different spatial distances from the blood vessel.

Figure 10:
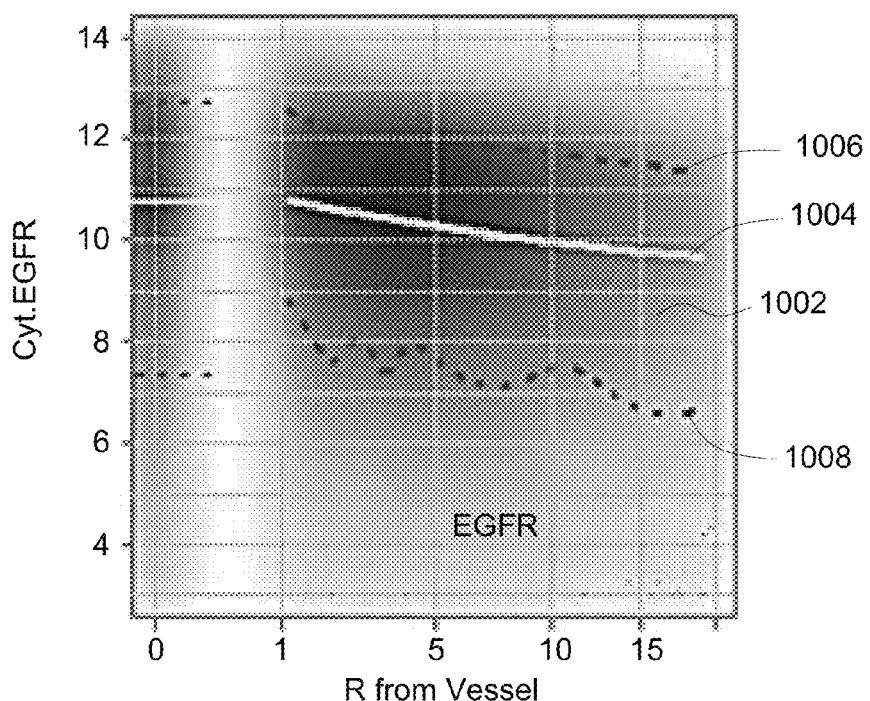
FIGS. 10-20 are graphs generated by exemplary embodiments showing expression levels of different non-structural biomarkers represented on the y-axis and different spatial distances from blood vessels represented on the x-axis.

FIG. 10 is a graph of expression levels of non-structural biomarker epidermal growth factor receptor (EGFR) along the y-axis and distances from the nearest blood vessel along the x-axis. FIG. 10 illustrates a scatterplot 1002 of the distribution of cells in the x-y space, a curve 1004 representing the median expression level of EGFR over different distance values, a curve 1006 representing the $90^{th}$ percentile expression level of EGFR over different distance values, and a curve 1008 representing the $10^{th}$ percentile expression level of EGFR over different distance values.

Figure 11:
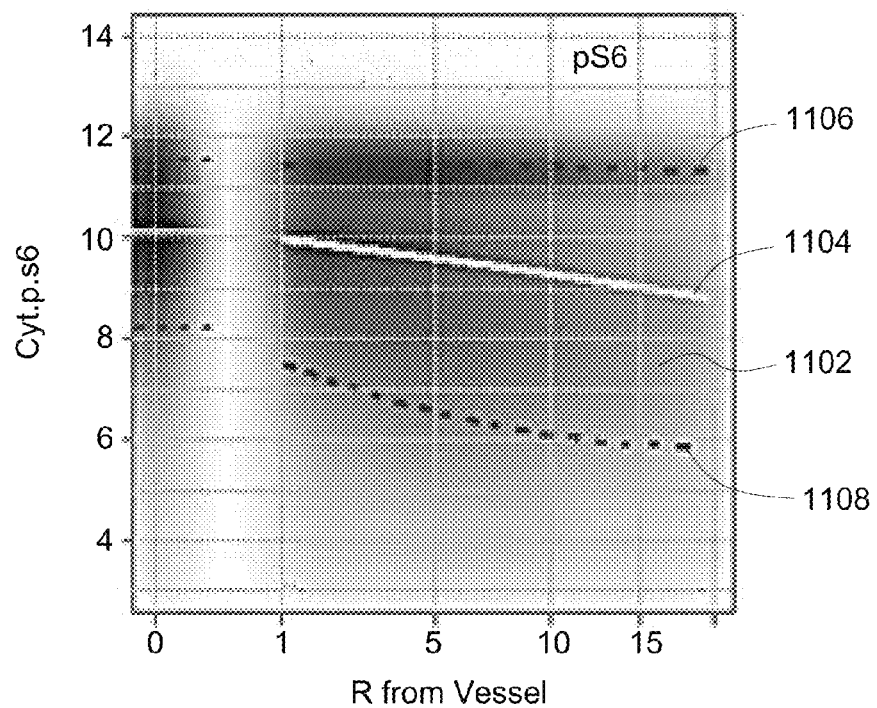

FIG. 11 is a graph of expression levels of non-structural biomarker pS6 along the y-axis and distances from the nearest blood vessel along the x-axis. FIG. 11 illustrates a scatterplot 1102 of the distribution of cells in the x-y space, a curve 1104 representing the median expression level of pS6 over different distance values, a curve 1106 representing the $90^{th}$ percentile expression level of pS6 over different distance values, and a curve 1108 representing the $10^{th}$ percentile expression level of pS6 over different distance values.

Figure 12:
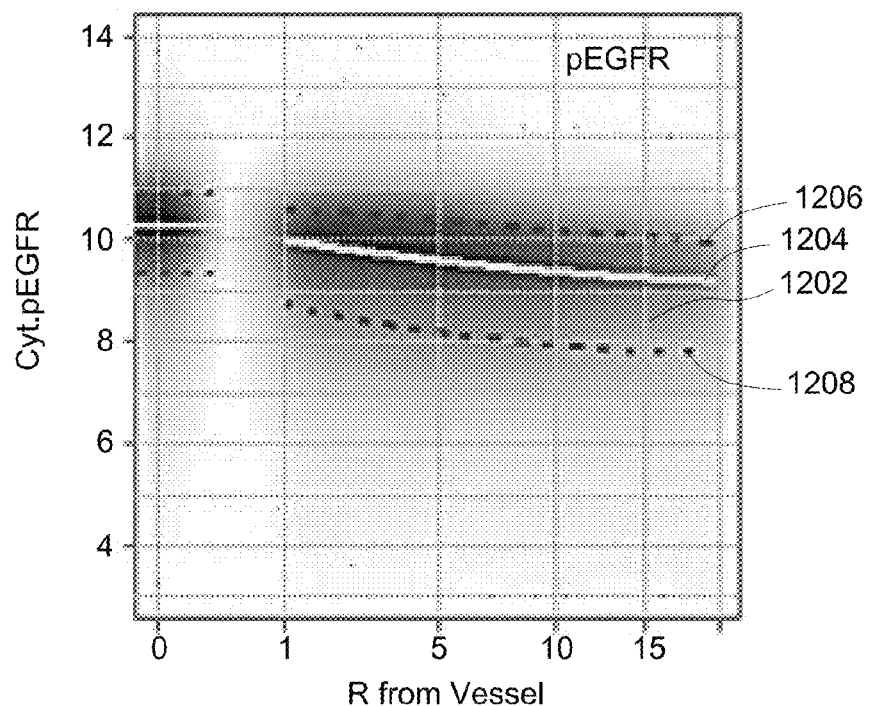

FIG. 12 is a graph of expression levels of non-structural biomarker phosphorylated epidermal growth factor receptor (pEGFR) along the y-axis and distances from the nearest blood vessel along the x-axis. FIG. 12 illustrates a scatterplot 1202 of the distribution of cells in the x-y space, a curve 1204 representing the median expression level of pEGFR over different distance values, a curve 1206 representing the $90^{th}$ percentile expression level of pEGFR over different distance values, and a curve 1208 representing the $10^{th}$ percentile expression level of pEGFR over different distance values.

Figure 13:
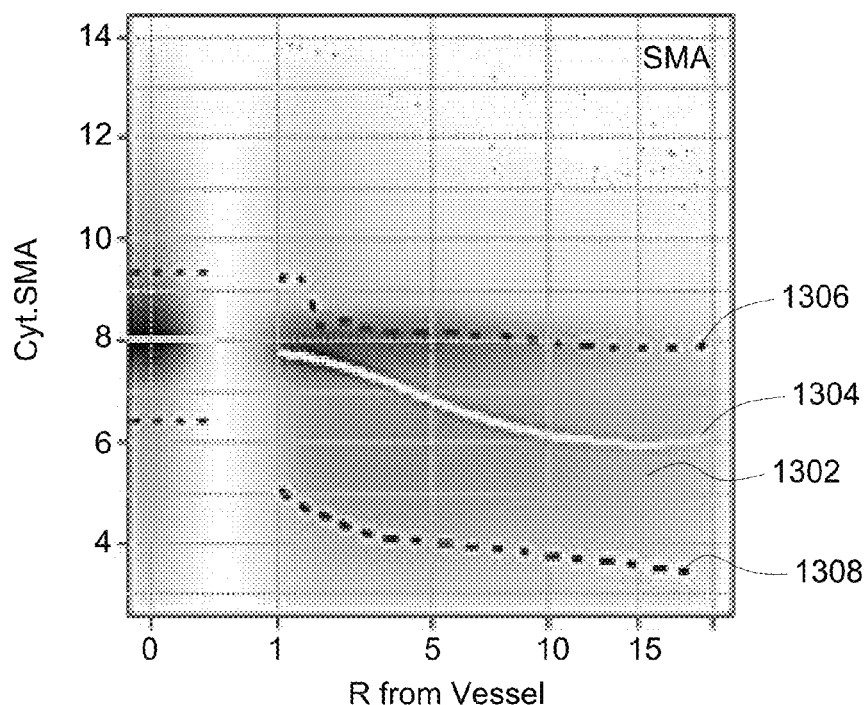

FIG. 13 is a graph of expression levels of non-structural biomarker for smooth muscle actin (SMA) along the y-axis and distances from the nearest blood vessel along the x-axis. FIG. 13 illustrates a scatterplot 1302 of the distribution of cells in the x-y space, a curve 1304 representing the median expression level of SMA over different distance values, a curve 1306 representing the $90^{th}$ percentile expression level of SMA over different distance values, and a curve 1308 representing the $10^{th}$ percentile expression level of SMA over different distance values.

Figure 14:
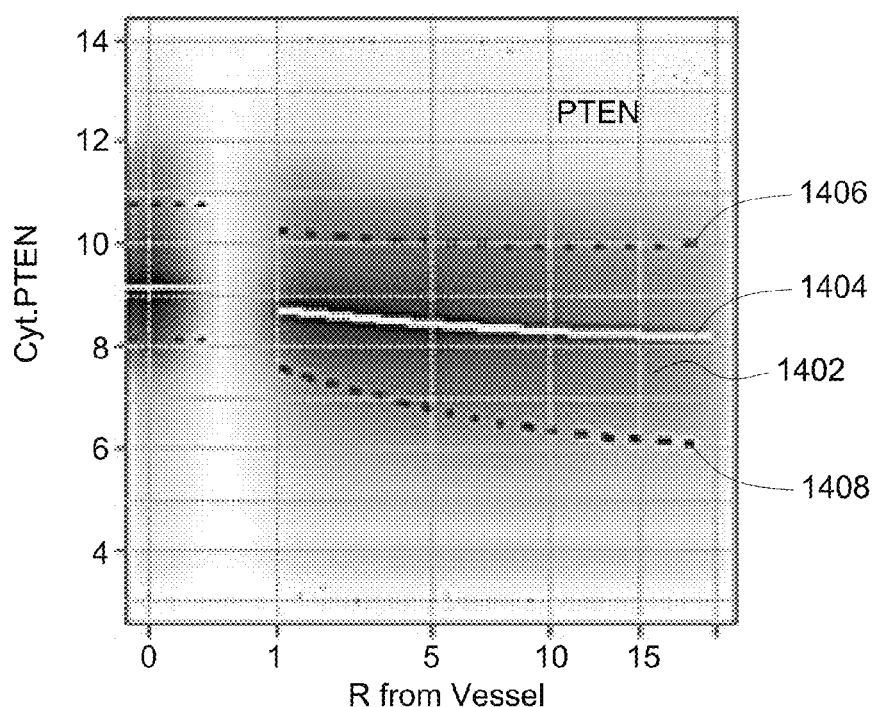

FIG. 14 is a graph of expression levels of non-structural biomarker phosphatase and tensin homolog (PTEN) along the y-axis and distances from the nearest blood vessel along the x-axis. FIG. 14 illustrates a scatterplot 1402 of the distribution of cells in the x-y space, a curve 1404 representing the median expression level of PTEN over different distance values, a curve 1406 representing the $90^{th}$ percentile expression level of PTEN over different distance values, and a curve 1408 representing the $10^{th}$ percentile expression level of PTEN over different distance values.

Figure 15:
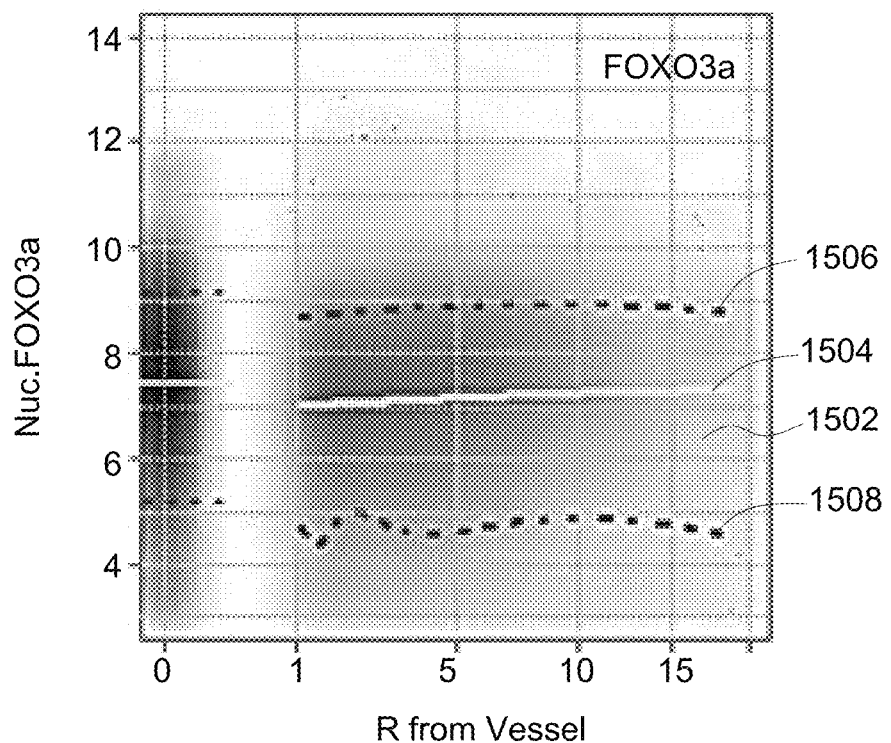

FIG. 15 is a graph of expression levels of non-structural biomarker forkhead box O3 (FOXO3a) along the y-axis and distances from the nearest blood vessel along the x-axis. FIG. 15 illustrates a scatterplot 1502 of the distribution of cells in the x-y space, a curve 1504 representing the median expression level of FOXO3a over different distance values, a curve 1506 representing the $90^{th}$ percentile expression level of FOXO3a over different distance values, and a curve 1508 representing the $10^{th}$ percentile expression level of FOXO3a over different distance values.

Figure 16:
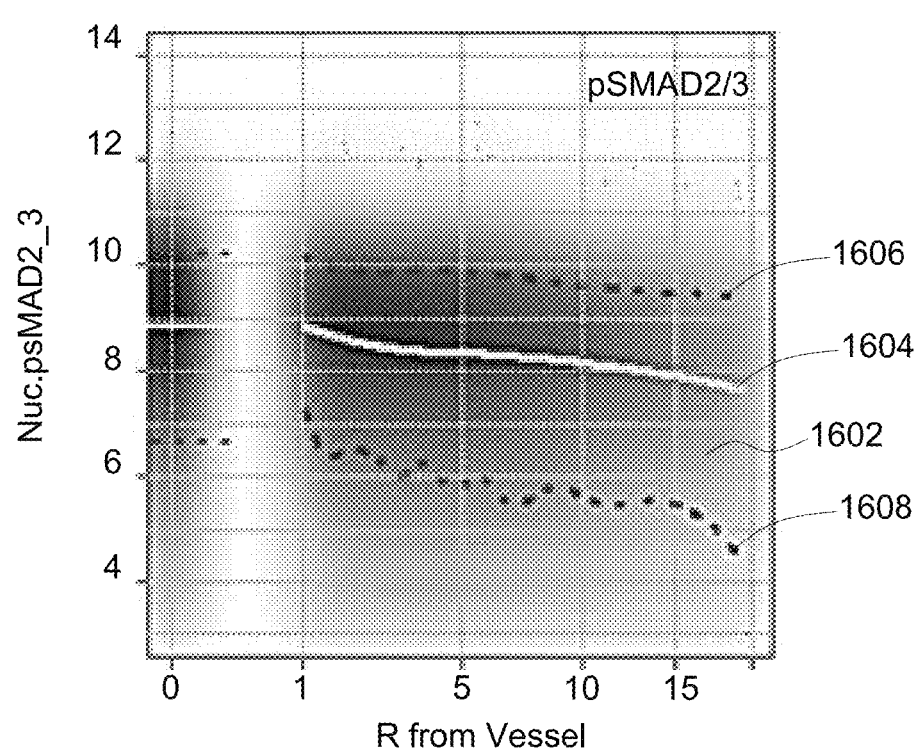

FIG. 16 is a graph of expression levels of non-structural biomarker pSMAD2/3 along the y-axis and distances from the nearest blood vessel along the x-axis. FIG. 16 illustrates a scatterplot 1602 of the distribution of cells in the x-y space, a curve 1604 representing the median expression level of pSMAD2/3 over different distance values, a curve 1606 representing the $90^{th}$ percentile expression level of pSMAD2/3 over different distance values, and a curve 1608 representing the $10^{th}$ percentile expression level of pSMAD2/3 over different distance values.

Figure 17:
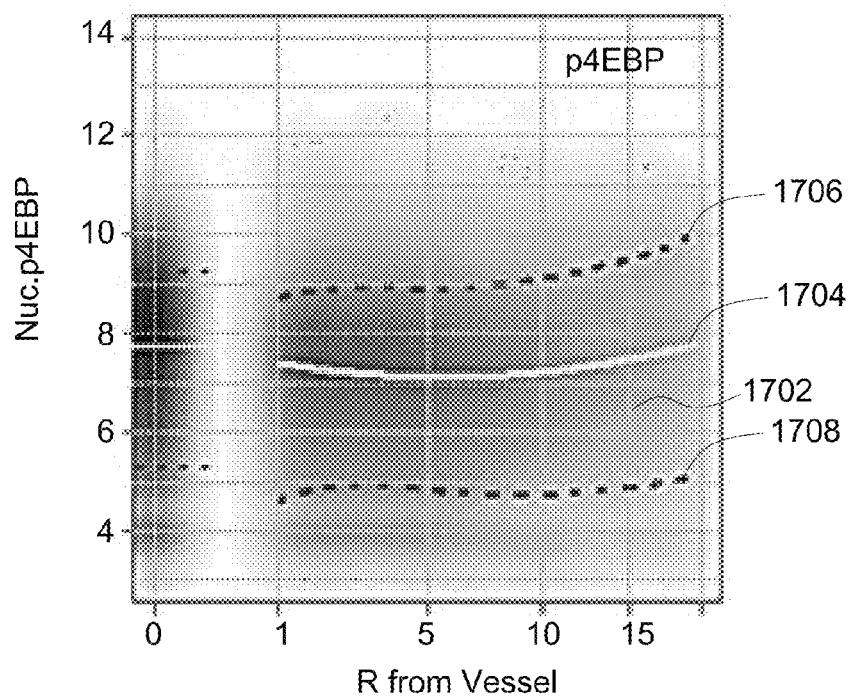

FIG. 17 is a graph of expression levels of non-structural biomarker p4EBP along the y-axis and distances from the nearest blood vessel along the x-axis. FIG. 17 illustrates a scatterplot 1702 of the distribution of cells in the x-y space, a curve 1704 representing the median expression level of p4EBP over different distance values, a curve 1706 representing the $90^{th}$ percentile expression level of p4EBP over different distance values, and a curve 1708 representing the $10^{th}$ percentile expression level of p4EBP over different distance values.

Figure 18:
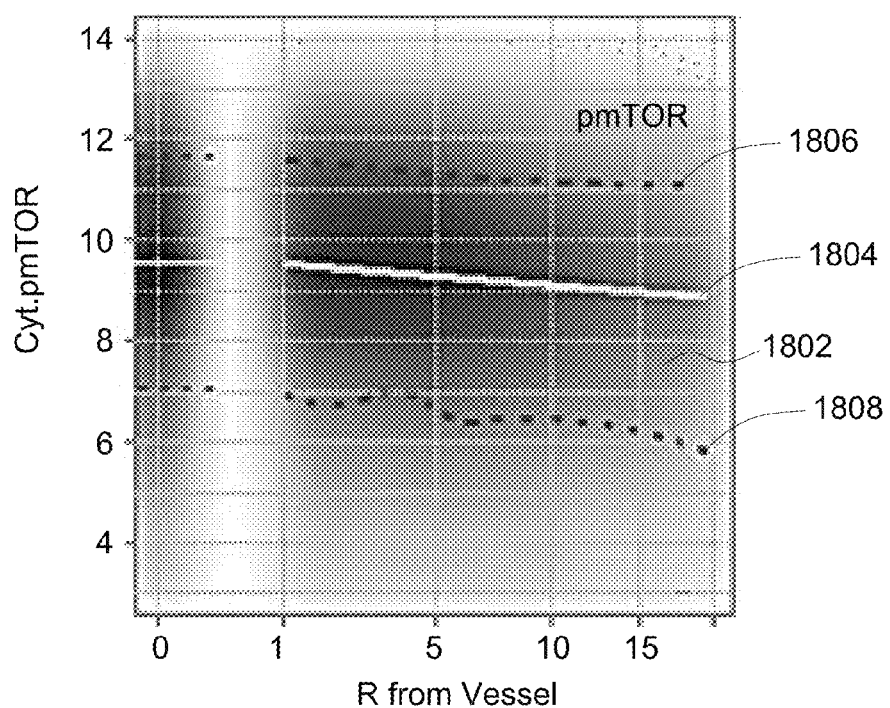

FIG. 18 is a graph of expression levels of non-structural biomarker pmTOR along the y-axis and distances from the nearest blood vessel along the x-axis. FIG. 18 illustrates a scatterplot 1802 of the distribution of cells in the x-y space, a curve 1804 representing the median expression level of pmTOR over different distance values, a curve 1806 representing the $90^{th}$ percentile expression level of pmTOR over different distance values, and a curve 1808 representing the $10^{th}$ percentile expression level of pmTOR over different distance values.

Figure 19:
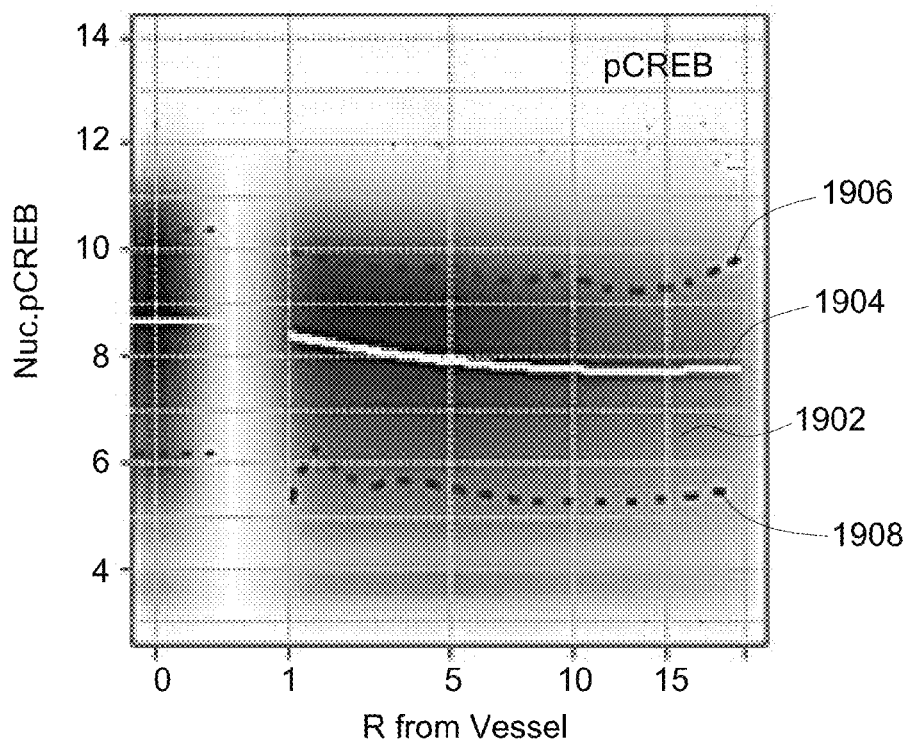

FIG. 19 is a graph of expression levels of non-structural biomarker pCREB along the y-axis and distances from the nearest blood vessel along the x-axis. FIG. 19 illustrates a scatterplot 1902 of the distribution of cells in the x-y space, a curve 1904 representing the median expression level of pCREB over different distance values, a curve 1906 representing the $90^{th}$ percentile expression level of pCREB over different distance values, and a curve 1908 representing the $10^{th}$ percentile expression level of pCREB over different distance values.

Figure 20:
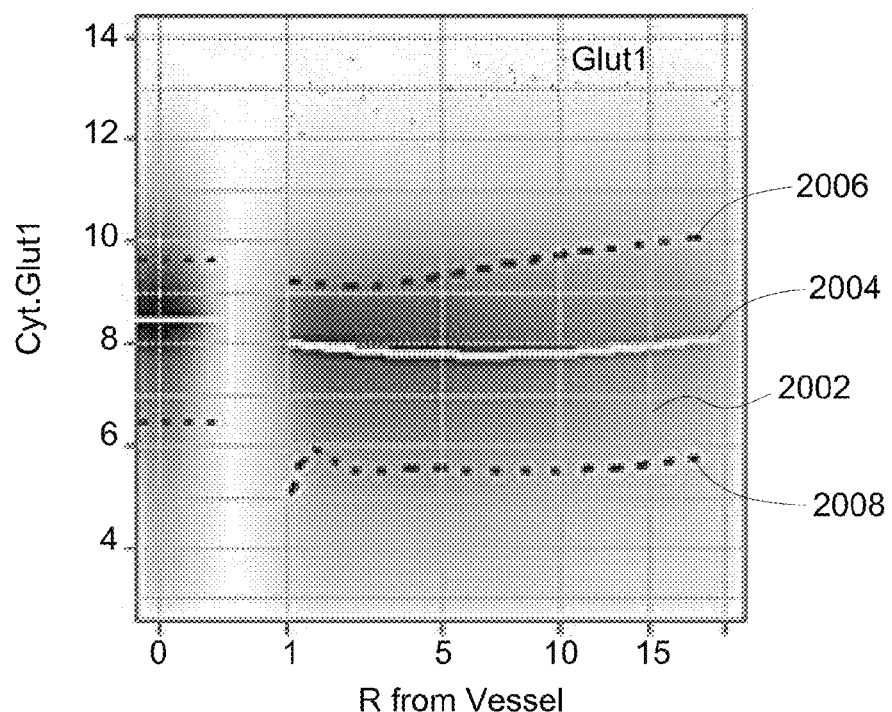

FIG. 20 is a graph of expression levels of non-structural biomarker Glut1 along the y-axis and distances from the nearest blood vessel along the x-axis. FIG. 20 illustrates a scatterplot 2002 of the distribution of cells in the x-y space, a curve 2004 representing the median expression level of Glut1 over different distance values, a curve 2006 representing the $90^{th}$ percentile expression level of Glut1 over different distance values, and a curve 2008 representing the $10^{th}$ percentile expression level of Glut1 over different distance values.

Exemplary embodiments may be used to unambiguously define the localization of immune cells to determine if the localization can be used in prognosis. For example, certain immune cells (e.g., CD8+ T cells) may have different disease prognosis based on their spatial distance from tumor cells. Similarly, certain tumor cells have different disease prognosis based on their spatial distance from immune cells. Exemplary embodiments may be used to determine the spatial distance from certain immune cells to the nearest one or more tumor cells in a cohort of users. Exemplary embodiments may then analyze the disease outcome for the immune cells and its relationship to the distances to the nearest tumor cell. Exemplary embodiments may be used to determine the spatial distance from certain tumor cells to the nearest one or more immune cells in a cohort of users. Exemplary embodiments may then analyze the disease outcome for the tumor cells and its relationship to the distances to the nearest immune cell. See, Mlecnik B et al., "Histopathologic-Based Prognostic Factors of Colorectal Cancers are Associated with the State of the Local Immune Reaction," *J Clin Oncol.*, 2011, 29(6):610-618; Funada, Y. et al., "Prognostic Significance of CD8+ T Cell and Macrophage Peritumoral Infiltration in Colorectal Cancer," *Oncology Reports,* 2003, 10(2): 309-313; Forssel, J. et al., "High Macrophage Infiltration along the Tumor Front Correlates with Improved Survival in Colon Cancer," *Clin. Cancer Res.,* 2007, 13(5): 1472-1479; and Kang, J. et al., "Intratumoral Macrophage Counts Correlate with Tumor Progression in Colorectal Cancer," *J. Surg. Oncol.,* 2010, 102(3)242-248; the entire contents of which are incorporated herein in their entirety by reference.

Exemplary embodiments may be used to differentiate cells based on distance of the cells from basement membranes and/or extracellular matrices. This cell differential enabled by exemplary embodiments has application in examining of cancer cells. Certain cancer cells associated with matrices, while other cancer cells acquire the capability to grow in a matrix-anchorage-independent manner. Matrix-associated cells may be more resistant to chemotherapy. Exemplary embodiments may be used to determine the spatial distance from certain cancer cells to the nearest matrix component. In one example, if certain cancer cells that are within a predetermined distance or a predetermined distance range from the nearest matrix component, it may be determined that the cancer cells have the ability to grow in a matrix-independent manner and/or may be more resistant to chemotherapy. See, Muranen, T. et al., "Inhibition of PI3K/mTOR Leads to Adaptive Resistance in Matrix-Attached Cancer Cells," *Cancer Cell,* 2012 Feb. 14, 21(2):227-39, the entire contents of which are incorporated herein in their entirety by reference.

Exemplary embodiments may be used in pharmaceutical research in which cancer cells may be analyzed before and after drug treatment to determine whether drug efficacy is affected by the distance of cancer cells from matrix components. For example, cancer cell populations at different distances from the nearest matrix component may be analyzed before and after drug treatment to determine biomarker expression levels that may or may not be affected by the drug. Exemplary embodiments may also be used in pharmaceutical research in which cancer cells may be analyzed to classify different types of tumors. For example, cancel cell populations at different distances from the nearest matrix component may be analyzed to determine if tumor morphology and/or tumor phenotype varies between cells that are associated with a matrix component and cells that are not associated with matrix components.

Exemplary embodiments may be used to characterize the level of vascularity in tissue, e.g., angiogenesis. In an exemplary embodiment, the spatial distances for morphological units (e.g., cells) from the nearest blood vessel may be used to determine vascularity, for example, by taking the average distance of the units from the nearest blood vessel.

Exemplary embodiments may be used to detect and analyze the level of hypoxia at different spatial distances from a morphological feature of interest (e.g., blood vessels). The degree of hypoxia may vary in some tissues as a function of distance from vasculature, and may be variable due to differences in vascular malformation or injury, as well as inherent differences in diffusion of dissolved oxygen in tissues. Exemplary embodiments enable quantitative spatial characterization of hypoxia by analyzing expression of biomarker Glut1 as a function of the distance from the nearest blood vessel.

In some exemplary embodiments, a clinical outcome may be automatically determined corresponding to biological tissue in a cohort of users based on a relationship between expression levels of one or more biomarkers in morphological units and corresponding spatial distances from a morphological feature of interest of the units. The analysis may be used to generate a predictive model for a clinical outcome corresponding to the biological tissue of the cohort based on the relationship between the expression levels of the one or more biomarker and the corresponding spatial distance from the morphological feature the first set of morphological units.

Some exemplary embodiments may perform a correlation analysis between expression levels of one or more biomarkers in morphological units and corresponding spatial distances from a morphological feature of interest of the units.

III. Exemplary Computing Device and Network Environment

Figure 21:
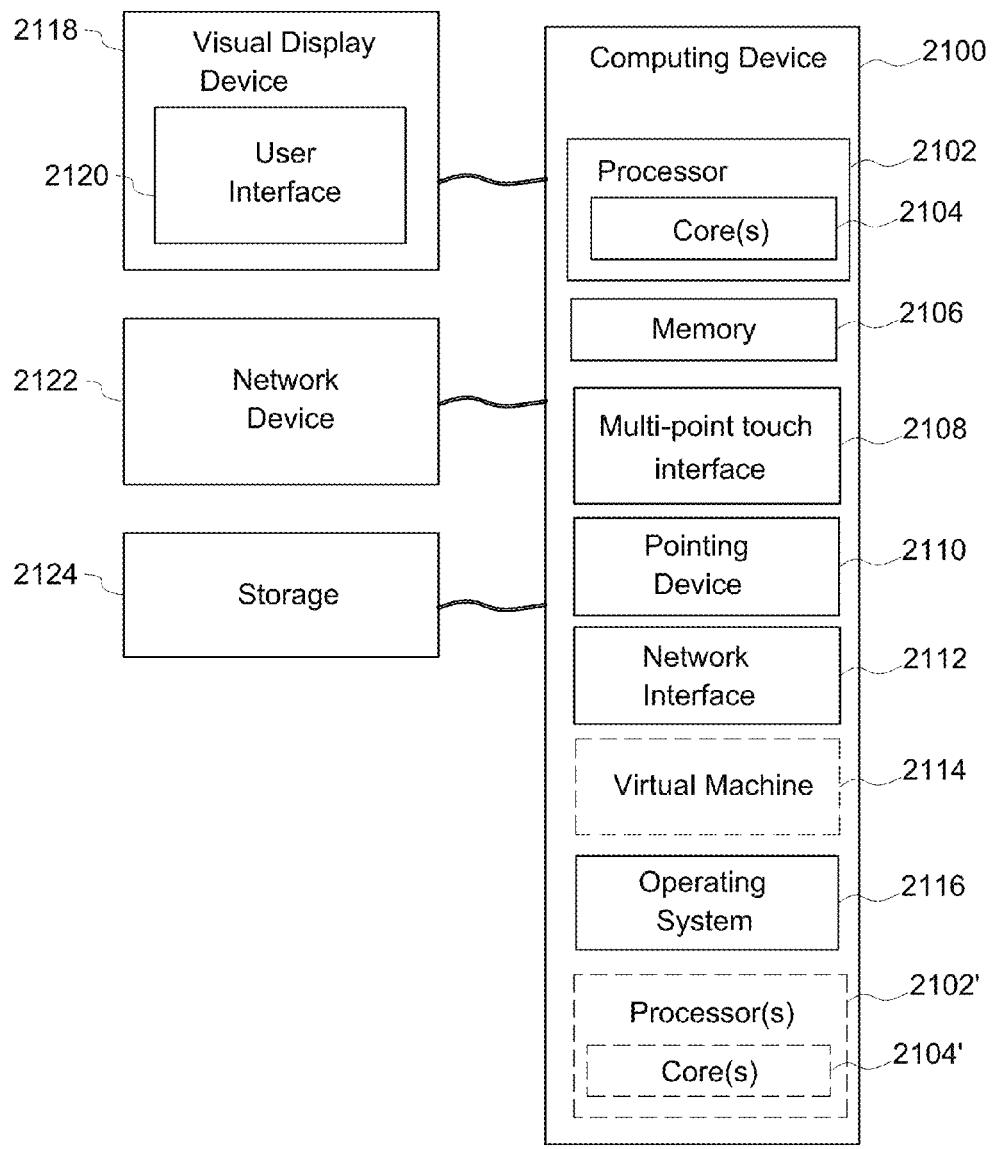
FIG. 21 is a block diagram of an exemplary computing device that may be used to implement exemplary embodiments.

FIG. 21 is a block diagram of an exemplary computing device 2100 that may be used in to perform any of the methods provided by exemplary embodiments. The computing device 2100 may be any suitable computing or communication device or system, such as a workstation, desktop computer, server, laptop, handheld computer, tablet computer (e.g., the iPad™ tablet computer), mobile computing or communication device (e.g., the iPhone™ communication device), or other form of computing or telecommunications device that is capable of communication and that has sufficient processor power and memory capacity to perform the operations described herein.

The computing device 2100 includes one or more non-transitory computer-readable media for storing one or more computer-executable instructions, programs or software for implementing exemplary embodiments. The non-transitory computer-readable media may include, but are not limited to, one or more types of hardware memory, non-transitory tangible media (for example, one or more magnetic storage disks, one or more optical disks, one or more USB flash-drives), and the like. For example, memory 2106 included in the computing device 2100 may store computer-readable and computer-executable instructions, programs or software for implementing exemplary embodiments. Memory 2106 may include a computer system memory or random access memory, such as DRAM, SRAM, EDO RAM, and the like. Memory 2106 may include other types of memory as well, or combinations thereof.

The computing device 2100 also includes processor 2102 and associated core 2104, and optionally, one or more additional processor(s) 2102' and associated core(s) 2104' (for example, in the case of computer systems having multiple processors/cores), for executing computer-readable and computer-executable instructions or software stored in the memory 2106 and other programs for controlling system hardware. Processor 2102 and processor(s) 2102' may each be a single core processor or multiple core (2104 and 2104') processor.

Virtualization may be employed in the computing device 2100 so that infrastructure and resources in the computing device may be shared dynamically. A virtual machine 2114 may be provided to handle a process running on multiple processors so that the process appears to be using only one computing resource rather than multiple computing resources. Multiple virtual machines may also be used with one processor.

A user may interact with the computing device 2100 through a visual display device 2118, such as a computer monitor, which may display one or more user interfaces 2120 that may be provided in accordance with exemplary embodiments. The visual display device 2118 may also display other aspects, elements and/or information or data associated with exemplary embodiments. The computing device 2100 may include other input/output (I/O) devices for receiving input from a user, for example, a keyboard or any suitable multi-point touch interface 2108, a pointing device 2110 (e.g., a mouse). The keyboard 2108 and the pointing device 2110 may be coupled to the visual display device 2118. The computing device 2100 may include other suitable conventional I/O peripherals.

The computing device 2100 may include one or more storage devices 2124, such as a hard-drive, CD-ROM, or other computer readable media, for storing data and computer-readable instructions and/or software that implement exemplary embodiments as taught herein. Exemplary storage device 2124 may also store one or more databases for storing any suitable information required to implement exemplary embodiments, for example, the exemplary data illustrated in the storage device of FIG. 1. The databases may be updated by a user or automatically at any suitable time to add, delete or update one or more items in the databases.

The computing device 2100 may include a network interface 2112 configured to interface via one or more network devices 2122 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 2112 may include a built-in network adapter, network interface card, PCMCIA network card, card bus network adapter, wireless network adapter, USB network adapter, modem or any other device suitable for interfacing the computing device 2100 to any type of network capable of communication and performing the operations described herein.

The computing device 2100 may run any operating system 2116, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 2116 may be run in native mode or emulated mode. In an exemplary embodiment, the operating system 2116 may be run on one or more cloud machine instances.

Figure 22:
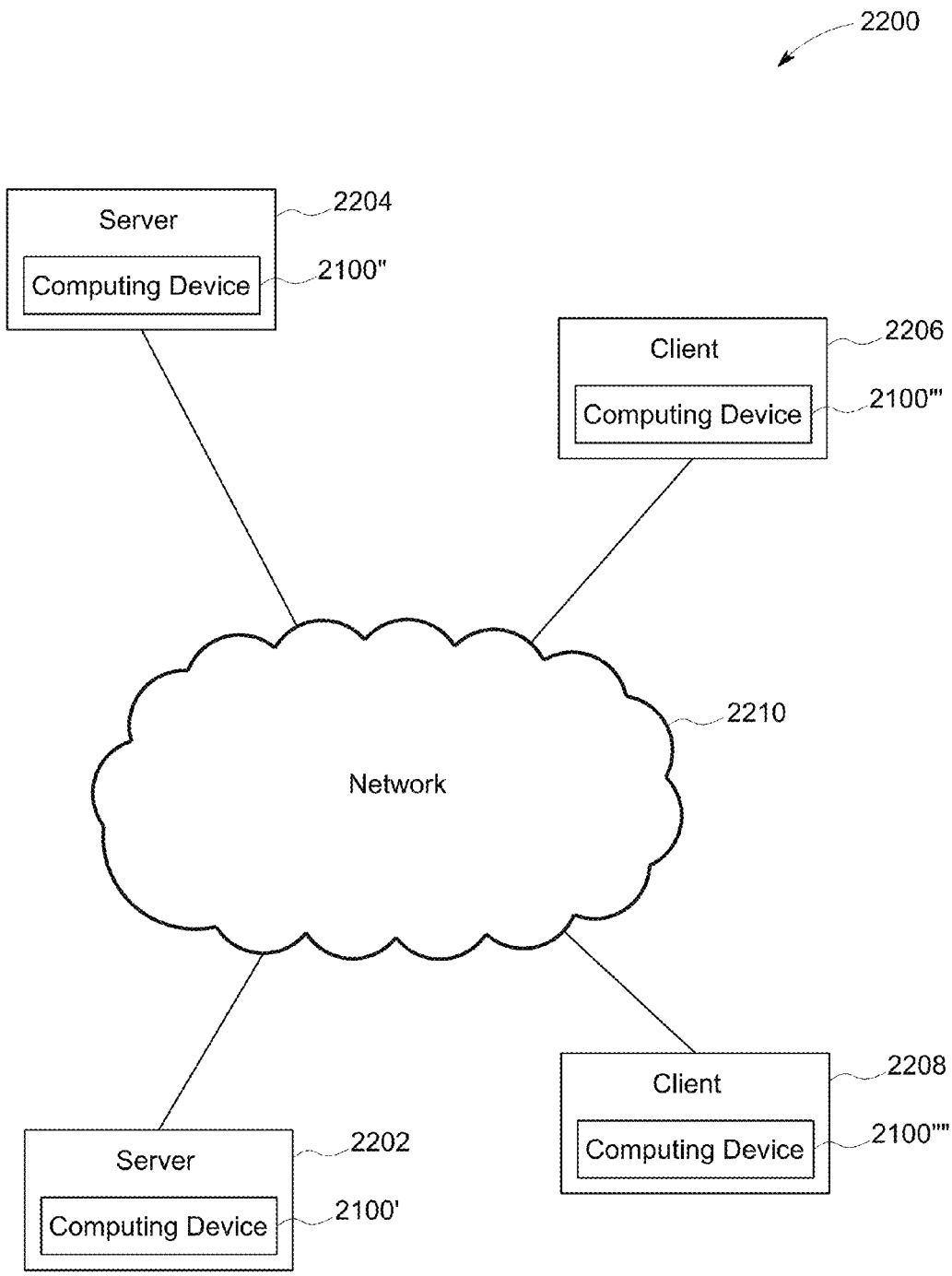
FIG. 22 is a block diagram of an exemplary network environment that may be used to implement exemplary embodiments.

FIG. 22 is a block diagram of an exemplary network environment 2200 suitable for a distributed implementation of exemplary embodiments. The network environment 2200 may include one or more servers 2202 and 2204 coupled to one or more clients 2206 and 2208 via a communication network 2210. The servers 2202 and 2204 may take the form of or include one or more computing devices 2100' and 2100", respectively, that are similar to the computing device 2100 illustrated in FIG. 21. Similarly, the clients 2206 and 2208 may take the form of or include one or more computing devices 2100''' and 2100'''', respectively, that are similar to the computing device 2100 illustrated in FIG. 21.

The network interface 2112 and the network device 2122 of the computing device 2100 enable the servers 2202 and 2204 to communicate with the clients 2206 and 2208 via the communication network 2210. The communication network 2210 may include, but is not limited to, the Internet, an intranet, a LAN (Local Area Network), a WAN (Wide Area Network), a MAN (Metropolitan Area Network), a wireless network, an optical network, and the like. The communication facilities provided by the communication network 2210 are capable of supporting distributed implementations of exemplary embodiments.

In an exemplary embodiment, the servers 2202 and 2204 may provide the clients 2206 and 2208 with computer-readable and/or computer-executable components or products under a particular condition, such as a license agreement. Alternatively, in another exemplary embodiment, the clients 2206 and 2208 may provide the servers 2202 and 2204 with computer-readable and computer-executable components or products under a particular condition, such as a license agreement.

In describing exemplary embodiments, specific terminology is used for the sake of clarity. For purposes of description, each specific term is intended to, at least, include all technical and functional equivalents that operate in a similar manner to accomplish a similar purpose. Additionally, in some instances where a particular exemplary embodiment includes a plurality of system elements or method steps, those elements or steps may be replaced with a single element or step. Likewise, a single element or step may be replaced with a plurality of elements or steps that serve the same purpose. Further, where parameters for various properties are specified herein for exemplary embodiments, those parameters may be adjusted up or down by 1/20th, 1/10th, 1/5th, 1/3rd, 1/2nd, and the like, or by rounded-off approximations thereof, unless otherwise specified. Moreover, while exemplary embodiments have been shown and described with references to particular embodiments thereof, those of ordinary skill in the art will understand that various substitutions and alterations in form and details may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than shown.

What is claimed is:

1. A computer-implemented method for determining a relationship between biomarker expression levels of morphological units in biological tissue and spatial distance from a morphological feature, the method comprising:
    identifying a morphological feature in an image of the biological tissue based on expression levels of a first biomarker indicative of the morphological feature;
    receiving a result of a segmentation analysis performed on the image of the biological tissue, the result identifying a first set of morphological units in the image external to the morphological feature, the first set of morphological units including cells and/or sub-cellular components;
    determining an expression level of a second biomarker corresponding to each unit in the first set of morphological units in the image of the biological tissue;
    determining a spatial distance between the morphological feature and each unit in the first set of morphological units; and
    automatically rendering, on a user interface displayed on a visual display device, a representation of a relationship between the expression levels of the second biomarker and the corresponding spatial distance from the morphological feature of the first set of morphological units wherein the representation of the expression levels of the second biomarker in the first set of morphological units includes overlaid renderings of:
        a representation of densities of the morphological units at different spatial distances from the morphological feature and at different expression levels of the second biomarker; and
        median expression levels of the second biomarker in the morphological units at different spatial distances from the morphological feature.

2. The method of claim 1, wherein the morphological feature includes a blood vessel that is the closest blood vessel to each unit in the first set of morphological units.

3. The method of claim 1, wherein the morphological feature includes a plurality of blood vessels in the vicinity of each unit in the first set of morphological units.

4. The method of claim 1, wherein the morphological feature includes necrotic tissue.

5. The method of claim 1, wherein the morphological feature includes a basement membrane.

6. The method of claim 1, wherein the morphological feature includes a collection of cells of a predetermined morphological or functional type.

7. The method of claim 1, wherein the first set of morphological units includes cells.

8. The method of claim 1, wherein the first set of morphological units includes sub-cellular components.

9. The method of claim 1, wherein the first set of morphological units includes cells of a single tissue type.

10. The method of claim 1, wherein the representation of the expression levels of the second biomarker in the first set of morphological units includes a representation of densities of the morphological units at different spatial distances from the morphological feature and at different expression levels of the second biomarker.

11. The method of claim 1, wherein the representation of the expression levels of the second biomarker in the first set of morphological units includes median expression levels of the second biomarker in the morphological units at different spatial distances from the morphological feature.

12. The method of claim 1, wherein the representation of the expression levels of the second biomarker in the first set of morphological units includes user-specified percentile expression levels of the second biomarker in the morphological units at different spatial distances from the morphological feature.

13. The method of claim 1, wherein the representation of the expression levels of the second biomarker in the first set of morphological units further comprises overlaid renderings of:
    expression levels of the second biomarker within a predetermined first range of percentiles of expression levels at different spatial distances from the morphological feature; and
    expression levels of the second biomarker within a predetermined second range of percentiles of expression levels at different spatial distances from the morphological feature.

14. The method of claim 1, further comprising:
    determining an expression level of a third biomarker in each unit in the first set of morphological units in the image of the biological tissue;
    determining a second set of morphological units within the first set of morphological units in which the expression levels of the second biomarker satisfy one or more predetermined level criteria and the expression levels of the third biomarker satisfy one or more predetermined level criteria;
    determining a spatial distance between the morphological feature and each unit in the second set of morphological units; and
    automatically rendering, on the visual display device, a representation of the second set of morphological units and a representation of the corresponding spatial distance from the morphological feature for each unit in the second set of morphological units.

15. The method of claim 1, further comprising:
    automatically determining a clinical outcome corresponding to the biological tissue of a cohort based on the relationship between the expression levels of the second biomarker and the corresponding spatial distance from the morphological feature of the first set of morphological units.

16. The method of claim 1, wherein the relationship includes a result of a correlation analysis.

17. The method of claim 1, further comprising:
    generating a predictive model for a clinical outcome corresponding to the biological tissue of the cohort based on the relationship between the expression levels of the second biomarker and the corresponding spatial distance from the morphological feature of the first set of morphological units.

18. A computer system for determining a relationship between biomarker expression levels of morphological units in biological tissue and spatial distance from a morphological feature, the system comprising:

a storage device; and a processor configured to:

identify a morphological feature in an image of biological tissue based on expression levels of a first biomarker indicative of the morphological feature, receive a result of a segmentation analysis performed on the image of the biological tissue, the result identifying a first set of morphological units in the image external to the morphological feature, the first set of morphological units including cells and/or sub-cellular components, determine an expression level of a second biomarker corresponding to each unit in the first set of morphological units in the image of the biological tissue, determine a spatial distance between the morphological feature and each unit in the first set of morphological units, determine a representation of a relationship between the expression levels of the second biomarker and the corresponding spatial distance from the morphological feature of the first set of morphological units wherein the representation of the expression levels of the second biomarker in the first set of morphological units includes overlaid renderings of:

a representation of densities of the morphological units at different spatial distances from the morphological feature and at different expression levels of the second biomarker; and median expression levels of the second biomarker in the morphological units at different spatial distances from the morphological feature, and store a representation of the relationship on the storage device.

* * * * *

UNITED STATES PATENT AND TRADEMARK OFFICE
CERTIFICATE OF CORRECTION

PATENT NO. : 8,873,827 B2  
APPLICATION NO. : 13/539187  
DATED : October 28, 2014  
INVENTOR(S) : McCulloch et al.

Page 1 of 1

It is certified that error appears in the above-identified patent and that said Letters Patent is hereby corrected as shown below:

In the Specification

In Column 5, Line 4, delete "data 106" and insert -- data 104 --, therefor.

In Column 5, Line 28, delete "in in" and insert -- in --, therefor.

Signed and Sealed this
Tenth Day of February, 2015

Michelle K. Lee
*Deputy Director of the United States Patent and Trademark Office*